US008612279B2

(12) United States Patent
Moon et al.

(10) Patent No.: US 8,612,279 B2
(45) Date of Patent: Dec. 17, 2013

(54) AD HOC GENERATION OF WORK ITEM ENTITY FOR GEOSPATIAL ENTITY BASED ON SYMBOL MANIPULATION LANGUAGE-BASED WORKFLOW ITEM

(75) Inventors: Billy Gayle Moon, Cary, NC (US); Bryan Turner, Durham, NC (US); James J. Miner, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 174 days.

(21) Appl. No.: 13/169,903

(22) Filed: Jun. 27, 2011

(65) Prior Publication Data

US 2012/0331472 A1    Dec. 27, 2012

(51) Int. Cl.
*G06F 17/00* (2006.01)

(52) U.S. Cl.
USPC ................................................. 705/7.26

(58) Field of Classification Search
USPC ................................................. 705/7.27
See application file for complete search history.

(56) References Cited

U.S. PATENT DOCUMENTS

| | | | |
|---|---|---|---|
| 7,299,419 B2 * | 11/2007 | Evans | 715/763 |
| 7,752,556 B2 * | 7/2010 | Forstall et al. | 715/761 |
| 2004/0049345 A1 * | 3/2004 | McDonough et al. | 702/12 |
| 2005/0076054 A1 | 4/2005 | Moon et al. | |
| 2006/0179143 A1 | 8/2006 | Walker et al. | |
| 2006/0188327 A1 | 8/2006 | Moon | |
| 2006/0206898 A1 | 9/2006 | Miner et al. | |
| 2007/0124296 A1 | 5/2007 | Toebes | |
| 2008/0126403 A1 | 5/2008 | Moon | |
| 2009/0307189 A1 | 12/2009 | Bobbitt et al. | |
| 2010/0145979 A1 * | 6/2010 | Barnett | 707/769 |

OTHER PUBLICATIONS

Sherman, Fraser; Lamda functions in Java; 1.15.12I eHOW; Jan. 31, 2012; 6 pages.*
Wikipedia, "Turning completeness", [online], Apr. 17, 2010, [retrieved on Apr. 19, 2010], Retrieved from the Internet: <URL: http://en.wikipedia.org/w/index.php?title=Turing_completeness&printable=yes>, pp. 1-6.
Wikipedia, "Programming Language", [online], Sep. 28, 2010, [retrieved on Sep. 29, 2010], Retrieved from the Internet: <URL: http://en.wikipedia.org/w/index.php?title=Programming_language&printable=yes>, pp. 1-16.
"Automata, State, Actions, and Interactions", [online], [retrieved on Mar. 10, 2010], Retrieved from the Internet: <URL: http://www.ebpml.org/pi-calculus.htm>, pp. 1-5.
Wikipedia, "Pi calculus", [online], Mar. 5, 2010, [retrieved on Mar. 10, 2010], Retrieved from the Internet: <URL: http://en.wikipedia.org/w/index.php?title=Pi_calculus&printable=yes>, pp. 1-11.

(Continued)

*Primary Examiner* — Thomas Dixon
(74) *Attorney, Agent, or Firm* — Leon R. Turkevich

(57) ABSTRACT

In one embodiment, a method comprises receiving from a user interface, by a computing device, a request for execution of at least one lambda function in an operation of a geospatial application, the geospatial application having lambda functions for operating on at least one of a workflow item or one or more entities of an ad hoc geospatial directory, the workflow item including at least one of the lambda functions for a workflow in the geospatial application; and executing by the computing device the at least one lambda function to form, in the geospatial application, a work entity that associates the workflow item with one of the entities, the work entity defining execution of the workflow on the one entity.

20 Claims, 16 Drawing Sheets

(56) References Cited

OTHER PUBLICATIONS

"The Message Passing Interface (MPI) standard", [online], [retrieved on Mar. 10, 2010], Retrieved from the Internet: <URL: http://www.mcs.anl.gov/research/projects/mpi/>, pp. 1-2.
Wikipedia, "Message Passing Interface", [online], Mar. 8, 2010, [retrieved on Mar. 10, 2010], Retrieved from the Internet: <URL: http://en.wikipedia.org/w/index.php?title=Message_Passing_Interface&printable=yes>, pp. 1-14.
Jini.org, "Main Page", [online], Mar. 8, 2007, [retrieved on Mar. 10, 2010],Retrieved from the Internet: <URL: http://www.jini_org/w/index.php?title=Main_Page&printable=yes>, pp. 1-6.
"LAM/MPI Parallel Computing", [online], Jul. 29, 2009, [retrieved on Mar. 10, 2010], Retrieved from the Internet: <URL: http://www.lam-mpi.org/>, pp. 1-2.
Wikipedia, "Erlang", [online], Jan. 24, 2010, [retrieved on Mar. 10, 2010], Retrieved from the Internet: <URL: http://en.wikipedia.org/w/index.php?title=Erlang&printable=yes>, 1 page.
Wikipedia, "Computational complexity theory", [online], Sep. 5, 2010, [retrieved on Sep. 17, 2010], Retrieved from the Internet: <URL: http://en.wikipedia.org/w/index.php?title=Computational_complexity_theory&printable=yes>, pp. 1-14.
Wikipedia, "Category theory", [online], Nov. 28, 2010, [retrieved on Dec. 2, 2010], Retrieved from the Internet: <URL: http://en.wikipedia.org/w/index.php?title=Category_theory&printable=yes>, pp. 1-9.
Chandra et al., "Paxos Made Live—An Engineering Perspective", [online], Jun. 20, 2007 [retrieved on Aug. 6, 2010], Retrieved from the Internet: <URL: http://www.chandrakin.com/paper2.pdf>, 2007ACM PODC 2007, pp. 1-16.
Ogawa et al., "Iterative-Free Program Analysis", [online], ICFP '03, Aug. 25-29, 2003, Uppsala, Sweden [retrieved on Sep. 17, 2010], Retrieved from the Internet: <URL: http://research.nii.ac.jp/~hu/pub/icfp03.pdf>, pp. 1-13.
Sasano et al., "Generation of Efficient Programs for Solving Maximum Multi-Marking Problems", [online], [retrieved on Aug. 17, 2010], Retrieved from the Internet: <URL: http://citeseerx.ist.psu.edu/viewdoc/summary?doi=10.1.1.5.9692>, pp. 1-20.
Sasano et al., "Make it Practical: A Generic Linear-Time Algorithm for Solving Maximum-Weightsum Problems", ACM ICFP 2000, [online], [retrieved on Aug. 17, 2010], Retrieved from the Internet: <URL: http://citeseerx.ist.psu.edu/viewdoc/summary?doi=10.1.1.5.7004>, pp. 1-13.
Wikipedia, "Boolean satisfiability problem", [online], [retrieved on Aug. 6, 2010], Retrieved from the Internet: <URL: http://en.wikipedia.org/wiki/Boolean_satisfiability_problem>, pp. 1-9.
Ramesh et al., "Nonlinear Pattern Matching in Trees", Journal of the Association for Computing Machinery, Apr. 1992, [online], [retrieved on Aug. 6, 2010], Retrieved from the Internet: <URL: http://citeseerx.ist.psu.edu/viewdoc/download?doi=10.1.1.87.2664&rep=rep1&type=pdf> vol. 39, No. 2, pp. 295-316.
Cai et al., "More Efficient Bottom-Up Multi-Pattern Matching in Trees" (1992) [online], [retrieved on Aug. 6, 2010], Retrieved from the Internet: <URL: http://citeseerxist.psu.edu/viewdoc/download;jsessionid=55996B64B7E81382DA93EC339B305F91?doi=10.1.1.35.1638&rep=rep1&type=pdf>, pp. 1-41.
Joshi et al., "Denali: a goal-directed superoptimizer", Jul. 30, 2001, [online], [retrieved on Aug. 6, 2010], Retrieved from the Internet: <URL: http://citeseerx.ist.psu.edu/viewdoc/download;jsessionid=23B228827C25CC16ADC12CADB90187EF?doi=10.1.1.23.5676&rep=rep1&type=pdf>, cover sheets (3) and pp. 1-16.
Wikipedia, "Turing machine", [online], [retrieved on Apr. 30, 2010], Retrieved from the Internet: <URL: http://en.wikipedia.org/wiki/Turing_machine>, pp. 1-19.
Rojas, "A Tutorial Introduction to the Lambda Calculus", [online], [retrieved on Apr. 28, 2010]. Retrieved from the Internet: <URL: http://www.inf.fu-berlin_de/lehre/WS03/alpi/lambda.pdf>, pp. 1-9.
Wikipedia, "Data fusion", [online], Feb. 9, 2010, [retrieved on Mar. 9, 2010] Retrieved from the Internet: <URL: http://en.wikipedia.org/w/index.php?title=Data_fusion&printable=yes>, pp. 1-5.

Oracle Beehive Administrator's Guide, Release 1 (1.4), e13797-02, [online], Dec. 2008, [retrieved on Mar. 8, 2010], Retrieved from the Internet: <URL: http://download.oracle.com/docs/cd/E13789_01/bh.100/e13797.pdf> pp. 1-310.
Purvis et al., "A Framework for Distributed Workflow Systems", [online], [retrieved on Mar. 8, 2010], Retrieved from the Internet: <URL: http://secml.otago.ac.nz/Documents/HICSS34-mkp-ST2IM04.pdf>, pp. 1-8.
"Mapping to WebSphere MQ Workflow", [online], [retrieved on Mar. 8, 2010], Retrieved from the Internet: <URL: http://publib.boulder.ibm.com/infocenter/dmndhelp/v6rxmx/topic/com.ibm.btools.help.modeler.doc/doc/reference/mappings/fdlexportmapping.html>, pp. 1-3.
Li et al., "A Decentralized Agent Framework for Dynamic Composition and Coordination for Autonomic Applications", Proceedings of the 16th International Workshop on Database and Expert Systems Applications (DEXA '05), [online], [retrieved on Mar. 8, 2010], Retrieved from the Internet: <URL: http://ieeexplore.ieee.org/stamp/stamp.jsp?arnumber=01508265>, pp. 1-5.
"kind, sort, and type", [online], [retrieved on Dec. 3, 2010], Retrieved from the Internet: <http://difference-between.com/english-language/kind-sort-and-type/>, pp. 1-3.
Wikipedia, "Kind, (type theory)", [online], Nov. 23, 2010, [retrieved on Dec. 2, 1010], Retrieved from the Internet: <URL: http://en.wikipedia.org/wiki/Kind_%28type_%29., pp. 1-3.
"A Kind System for GHC", [online], [retrieved on Dec. 3, 2010], Retrieved from the Internet: <URL: http://hackage.haskell.org/trac/ghc/wiki/KindSystem>, pp. 1-7.
Wikipedia, "Many-sorted logic", [online], Oct. 16, 2010, [retrieved on Dec. 10, 2010], Retrieved from the Internet: <URL: http://en.wikipedia.org/w/index.php?title=Many-sorted_logic&printable=yes>, 1 page.
MSDN, "How to: Deploy a Workflow Template", [online], [retrieved on Mar. 8, 2010], Retrieved from the Internet: <URL: http://msdn.microsoft.com/en-us/library/ms460303%28printer%29.aspx>, pp. 1-2.
Wikipedia, "Mobile agent", [online] Feb. 27, 2010, [retrieved on Mar. 9, 2010], Retrieved from the Internet: <URL: http://en.wikipedia.org/w/index.php?title=Mobile_agent&printable=yes>, pp. 1-3.
Nagleberg, "Building Geospatial Tools from Workflow Systems", [online], Sep. 10, 2001, [retrieved on Mar. 8, 2010], Retrieved from the Internet: <URL: http://www.cct.lsu.edu/~gallen/Students/Nagelberg_Summer2007.pdf>, pp. 1-3.
Farrell (presenter), "North Carolina Geospatial Data Archiving Project/NDIIPP: Collection and preservation of at-risk digital geospatial data", [online], Mar. 27-28, 2005, [retrieved on Mar. 8, 2010], Retrieved from the Internet: <URL: http://www.lib.ncsu.edu/ncgdap/presentations/Robs_workflow_presentation_State_Arch_mtg_Mar_2006.ppt>, pp. 1-15.
"SAP Business Workflow (BC-BMT-WFM)", [online], [retrieved on Mar. 8, 2010], Retrieved from the Internet: <URL: http://help.sap.com/saphelp_nw04/helpdata/en/35/26b144afab52b9e10000009b38f974/content.htm>, 1 page.
Wikipedia, "Semantics", [online], Apr. 19, 2010, [retrieved on Apr. 19, 2010], Retrieved from the Internet: <URL: http://en.wikipedia.org/wiki/Semantics>, pp. 1-7.
"Socialight", [online], [retrieved on Mar. 8, 2010], Retrieved from the Internet: <URL: http://socialight.com/>, pp. 1-2.
Wikipedia, "Strong typing", [online], Jan. 7, 2011, [retrieved on Jan. 15, 2011], Retrieved from the Internet: <URL: http://en.wikipedia.org/w/indwx.php?title=Strong_typing&printable=yes., pp. 1-3.
Bea WebLogic Integration, "Using the WebLogic Integration Studio", Rel. 7.0, [online] Jun. 2002, [retrieved on Mar. 8, 2010], Retrieved from the Internet: <URL: http://web.archive.org/web/20040731143205/edocs.bea.com/wli/docs70/pdf/studio.pdf>, 426 pages.
Rees et al., "The T Manual Fifth Edition—Pre-Beta Draft", [online] Oct. 28, 1988, [retrieved on Jan. 18, 2011], Retrieved from the Internet: <URL: http://repository.readscheme.org/ftp/papers/t_manual.pdf>, (1) cover page, pp. 1-177.
Wikipedia, "Type theory", [online], Nov. 24, 2010, [retrieved on Dec. 2, 2010], Retrieved from the Internet: <URL: http://en.wikipedia.org/w/index.php?title=Type_theory&printable=yes>, pp. 1-9.

(56) References Cited

OTHER PUBLICATIONS

"Processing geospatial vertical data", [online], [retrieved on Mar. 8, 2010], Retrieved from the Internet: <URL: http://virtualexplorer.com.au/article/2008/194/geospatial-data-using-google-earth/vertical.html>, pp. 1-5.

Turner et al., U.S. Appl. No. 12/972,069, filed Dec. 17, 2010.

Moon et al., U.S. Appl. No. 13/085,686, filed Apr. 13, 2011.

\* cited by examiner

SML Language, 16

-Total Functional Language and Does Not Permit Partial Functions

-Independent of any Hardware or Software-Specific Requirements of Any Computing System -Non-Turing Complete: All Functions Must Return a Result -Metalanguage for Describing Semantics of Functions in an Application: Application Written as Logical Specification -Application Functions Described Using at Least the Following Logical Types: Tuple, Sum, and/or Lambda Type

Figure 4

| Sort Level | 72d |
| Kind Level | 72c |
| Type Level (Typing Discipline) (Tuples, Sums, Lambdas) | 72b |
| Semantic / Term Level (Tuples, Sums, Lambdas) | 72a |

Figure 5

```
WorkFlowItem Data Structure=
145 ──→ -WorkID = 1,
146 ──→ -StateID = 4,
162 ──→ -Availability = Private (Owner_ID) | Public
164 ──→ -WorkFlow State Tag = "1.D",
166 ──→ -WorkFlow State Label = "Active Fire, Need Firefighter Here",
168 ──→ -Parent State (WorkID = 1, StateID = null),
170 ──→ -Child State(s) (WorkID, StateID),
156c ──→ -λ: Add New Child State (Private | Public, Add Label |
                Add GoTo Branch | Add Geospatial λ),
156d ──→ -λ: Edit Child State (WorkID, StateID, Change Label,
                Add/Change GoTo Branch, Add/Change
                Geospatial λ, Delete),
156e ──→ -λ: Edit WorkFlowItem State (Add GoTo Branch, Modify Label,
                Change Parent, Attach to Additional Parent State
                (λ Query for Available WorkFlowItems)),
156f ──→ -λ: Add New WorkflowItem (λ Query for Available WorkFlow
                Items, Add Label | Add GoTo Branch | Add Geospatial λ),
156a ──→ -λ: Associate WorkFlowItem with selected GeoSpatial Entity
                (by EID, IP Address, etc.).
```
140

AD HOC GENERATION OF WORK ITEM ENTITY FOR GEOSPATIAL ENTITY BASED ON SYMBOL MANIPULATION LANGUAGE-BASED WORKFLOW ITEM

TECHNICAL FIELD

The present disclosure generally relates to the writing, compiling, and execution of executable applications or programs on different computing systems having prescribed hardware and/or software specific requirements. More particularly, the present disclosure relates to geospatial applications or programs that are written for generation of work items for geospatial entities in a distributed computing environment.

BACKGROUND

This section describes approaches that could be employed, but does not necessarily describe approaches that previously have been conceived or employed. Hence, unless explicitly specified otherwise, any approaches described in this section are not prior art to the claims in this application, and any approaches described in this section are not admitted to be prior art by inclusion in this section.

Processor-based applications or programs to date have been written in accordance with constraints imposed by hardware-specific and/or software-specific constraints of the underlying computing system intended to execute the applications or programs. For example, assembly language instruction sets are designed for a specific processor circuit for manipulation of digital bits (i.e., having a value of either 0 or 1) that can be interpreted by the specific processor circuit either as an executable instruction, an address value for a register or memory location accessible by the specific processor circuit, or data: applications written using the assembly instruction sets must strictly follow the associated software and/or hardware based requirements of the assembly language instruction sets (e.g., syntax, etc.). Operating systems (e.g., Microsoft Windows XP®, Unix, Linux, etc.) provide a level of abstraction that enables application developers to ignore at least some of the hardware or software-based constraints of the specific processor circuit; however, such operating systems in return impose their own hardware and/or software based constraints that must be followed by an application executed using such operating systems to perform a prescribed function.

Consequently, substantial compatibility problems continue to exist when an attempt is made to employ an existing application (developed for a first computing system) on a second computing system that is not perfectly compatible with the first computing systems. Moreover, more complex computing systems are constantly being developed (e.g., newer processor circuits offering multithreading; parallel computing or blade computing; network-based distributed computing; cloud computing, etc.). Hence, application developers continue to confront the difficult requirement of understanding the features and requirements of the more complex computing system in order to modify existing applications for compatibility or develop a new application that operates without failure in the more complex computing system. The difficulty increases dramatically with the concurrent requirement in geospatial applications of responding to ad hoc events for ad hoc collaboration.

BRIEF DESCRIPTION OF THE DRAWINGS

Reference is made to the attached drawings, wherein elements having the same reference numeral designations represent like elements throughout and wherein:

FIG. 4 illustrates example attributes of the symbol manipulation language 16, according to an example embodiment.

FIG. 5 illustrates a typing hierarchy used to establish strongly typed definitions for elements of an example geospatial application, according to an example embodiment.

FIG. 15 illustrates in further detail an example workflow item data structure that defines a corresponding workflow state and enables ad hoc modification of workflows in the geospatial application, according to an example embodiment.

DESCRIPTION OF EXAMPLE EMBODIMENTS

Overview

Figure 1:
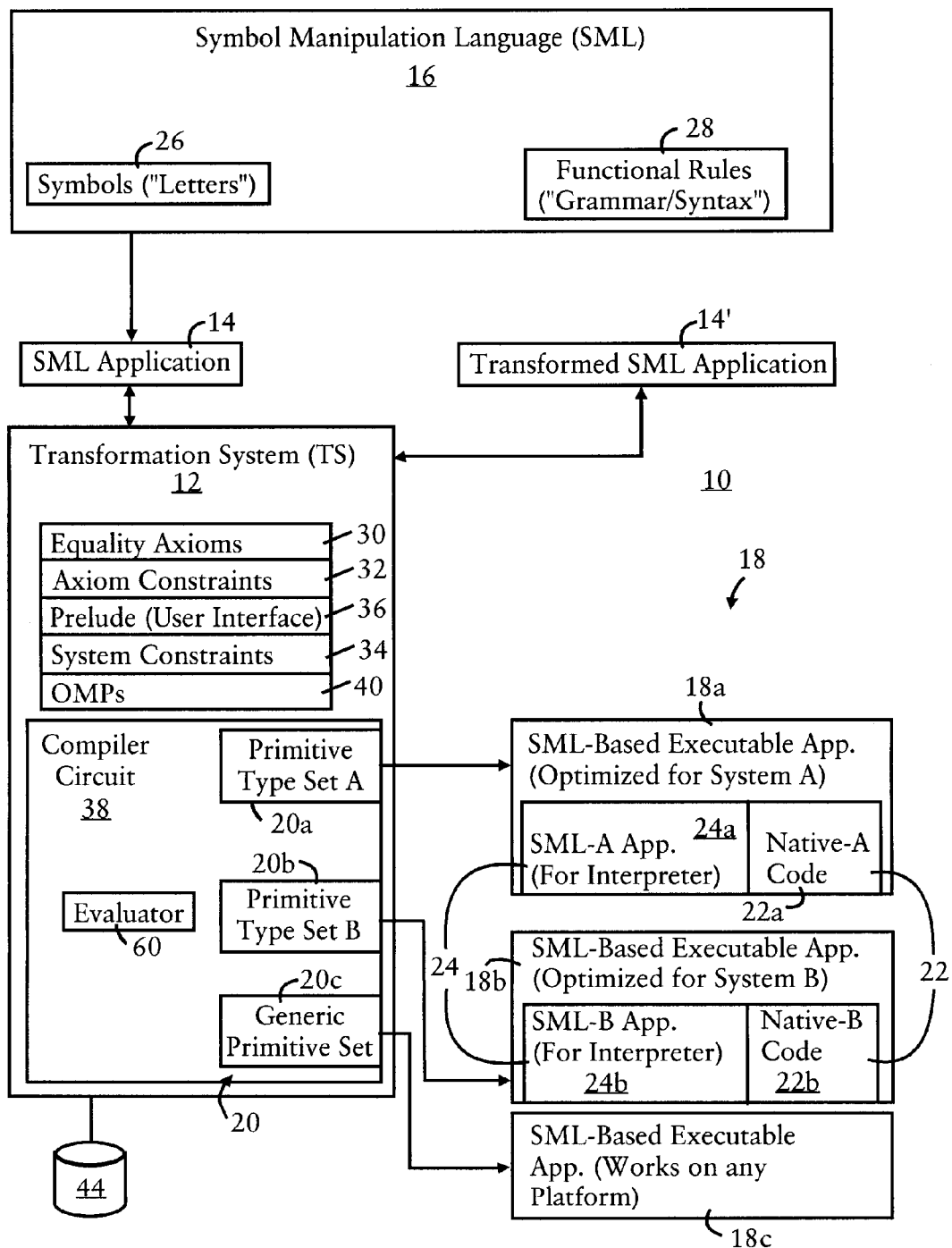
FIG. 1 illustrates an example system having an apparatus for executing optimization of an executable application written according to a prescribed symbol manipulation language (SML), according to an example embodiment.

In one embodiment, a method comprises receiving from a user interface, by a computing device, a request for execution of at least one lambda function in an operation of a geospatial application, the geospatial application having lambda functions for operating on at least one of a workflow item or one or more entities of an ad hoc geospatial directory, the workflow item including at least one of the lambda functions for a workflow in the geospatial application; and executing by the computing device the at least one lambda function to form, in the geospatial application, a work entity that associates the workflow item with one of the entities, the work entity defining execution of the workflow on the one entity.

In another embodiment, an apparatus comprises an interface circuit and an execution circuit. The interface circuit is configured for receiving from a user interface a request for execution of at least one lambda function in an operation of a geospatial application, the geospatial application having lambda functions for operating on at least one of a workflow item or one or more entities of an ad hoc geospatial directory, the workflow item including at least one of the lambda functions for a workflow in the geospatial application. The execution circuit is configured for executing the at least one lambda function to form, in the geospatial application, a work entity that associates the workflow item with one of the entities, the work entity defining execution of the workflow on the one entity.

DETAILED DESCRIPTION

Outline of Detailed Description

I. INTRODUCTION
  A. Overview
  B. The Symbol Manipulation Language
  C. A Distributed Services Engine
  1. Evaluator
  2. Native Compilation
II. Geospatial Language Stack Having Segregated Language Primitives
III. Example SML Application: GeoSpatial Application
IV. Example Hardware Overview
V. Optimization of Geospatial Application for Ad Hoc Geospatial Directory
VI. Ad Hoc Association of Workflow Items to Geospatial Entities

I. INTRODUCTION

Particular embodiments enable executable applications to be written in a manner that is completely independent of any attribute of any computing system, i.e., independent of any computing system deployment model. In particular, the executable applications are written according to a prescribed symbol manipulation language (SML). Consequently, the particular embodiments can provide an ad hoc geospatial directory of entities (e.g., users, IP-based devices, etc.) in a distributed and decentralized system, based on optimizing an SML-based geospatial application.

The particular embodiments also can provide workflow items representing respective execution states of one or more prescribed workflows in the SML-based geospatial application. Each workflow can include execution states, arranged for example in the form of a directed acyclic graph (DAG), that can identify work that needs to be performed on an entity in the ad hoc geospatial directory, for example designating a location entity (identifiable by an RFID tag) with the workflow item "need an expert to investigate" for a workflow entitled "investigate hazardous waste" (or more generically "Hazard"). The data structures used to represent the entities of the ad hoc geospatial directory, and the workflow items of the prescribed workflows, can include strongly typed lambda functions according to the prescribed SML that enables an optimized association between a workflow item and a geospatial entity, for formation of a work entity: the work entity associates the workflow item with the geospatial entity in order to define the execution of the workflow on the geospatial entity. A work item entity associated with the work entity also can be generated that includes strongly typed lambda functions (inherited from the corresponding workflow item) that enables a user to modify the corresponding workflow state that is applied the geospatial entity: the use of strong typing enables the modification of the workflow state by the user to be instantaneously applied to the workflow executed by the geospatial application, enabling the modification to be instantaneously available to any other work entities applying the same workflow to other geospatial entities.

Hence, a user can generate a work item entity identifying a workflow state to be executed on a geospatial entity, and also can modify the work item entity that applies the specific workflow state to the specific geospatial entity, enabling the modification to be applied instantaneously throughout the geospatial application.

A description will first be provided of the symbol manipulation language, and optimization and execution thereof, followed by a description of a geospatial application written according to the prescribed symbol manipulation language for generation of an ad hoc geospatial directory of entities in a distributed and decentralized computing system, ad hoc assignment of workflows to entities in the ad hoc geospatial directory, and ad hoc modification of the workflows in the geospatial application.

The term "application" or "program" is defined as executable information stored on at least one non-transitory tangible medium and that can be configured for execution on one or more hardware-based processor circuits: the executable information can be stored as a single container (e.g., an executable file) on at least a single non-transitory tangible medium, described below; the executable information also can be stored as multiple components (e.g., fragments) on one or more non-transitory tangible media, where execution of the components by the same or distinct processor circuits can result in execution of the application (e.g., distributed computing). Unless specified otherwise, the execution of components by distinct processor circuits need not necessarily be concurrent, rather the components could be executed as distinct and independent events.

Deployment of any computing system requires establishing software or hardware specific requirements on the computing system. Hence, a "computing system deployment model" is defined herein as any computing system having at least one or more software or hardware specific requirements for deployment (i.e., physical and tangible execution) of the computing system. At least one software and/or hardware specific requirement of any computing system can be used to establish a "computing system deployment model". Hence, a computing system deployment model "A" will have at least one hardware or software specific requirement that distinguishes the computing system deployment model "A" from another computing system deployment model "B".

I.A. Overview

FIG. 1 is a diagram illustrating a system 10 having a transformation system 12 for execution of an SML application 14 according to a prescribed SML language 16, according to an example embodiment. The system 10 includes a transformation system 12 that is executed by at least one processor-based computing device (e.g., computing node 70 of FIG. 3) and configured for executing an optimization of an application 14 written according to a prescribed symbol manipulation language (SML) 16. The SML application 14 can be supplied to the transformation system 12 by a processor-based computing device (e.g., a client device such as a portable computer, web-enabled cellphone, etc.) that is distinct from the computing device (e.g., 70 of FIG. 3) executing the transformation system, for example via a network-based link (Ethernet link, Internet Protocol connection, etc.); alternately the client device and the transformation system 12 can be implemented within a single processor-based device.

Existing programming languages assume hardware-specific or software-specific parameters (i.e., requirements, constraints, etc.) for a particular computing system deployment model. Example hardware-specific requirements that have been assumed by existing programming languages for a particular computing system deployment model can include the type of microprocessor used (e.g., 32-bit or 64-bit, single core, dual core or multiple core, etc.), the manufacturer of the microprocessor (e.g., Intel processor vs. ARM processor or Motorola processor), whether the application is executed in a stand-alone computer, or in a network according to a prescribed computation model (e.g., client/server, peer to peer, distributed computing, etc.). Example software specific requirements that have been assumed by existing programming languages for a particular computing system deployment model can include the type of operating system in use (e.g., UNIX, Windows, etc.) or a given version of the operating system in use by the computing system deployment model.

The prescribed symbol manipulation language (SML) 16 is distinctly different from existing programming languages, in that the prescribed symbol manipulation language is a purely functional language that enables an executable application 14 to be expressed as a logical specification that describes functions to be executed by any computing system, independent of any hardware specific or software specific requirements of any computing system. In other words, the executable application 14 can be expressed as a manipulation of symbols consisting only of the symbol manipulation language 16 elements, described below, in a manner that is independent of any computing system deployment model. Consequently, any application 14 written in the prescribed symbol manipulation language 16 can have absolutely no relationship to any attribute of any computing system deployment model. Hence, any application 14 written in the prescribed symbol manipulation language 16 is completely independent of any software and/or hardware specific requirements of any computing system.

The transformation system 12 can provide a "mapping" between the application 14 and a particular computing system deployment model, for example certain hardware-based computing systems. The transformation system 12 can provide this "mapping" based on executing a fully nondestructive logical transformation of the application 14 into a transformed application 14' that is semantically equivalent to the application 14. This fully nondestructive logical transformation enables an unlimited number of logical transformations, as required, between the original application 14 and multiple variations (e.g., 14', 18) of the original applications, where any one variation of the original application (i.e., program variant) can be an optimization for a prescribed computing system based on axioms and constraints that can be associated with a given computing system.

Figure 3:
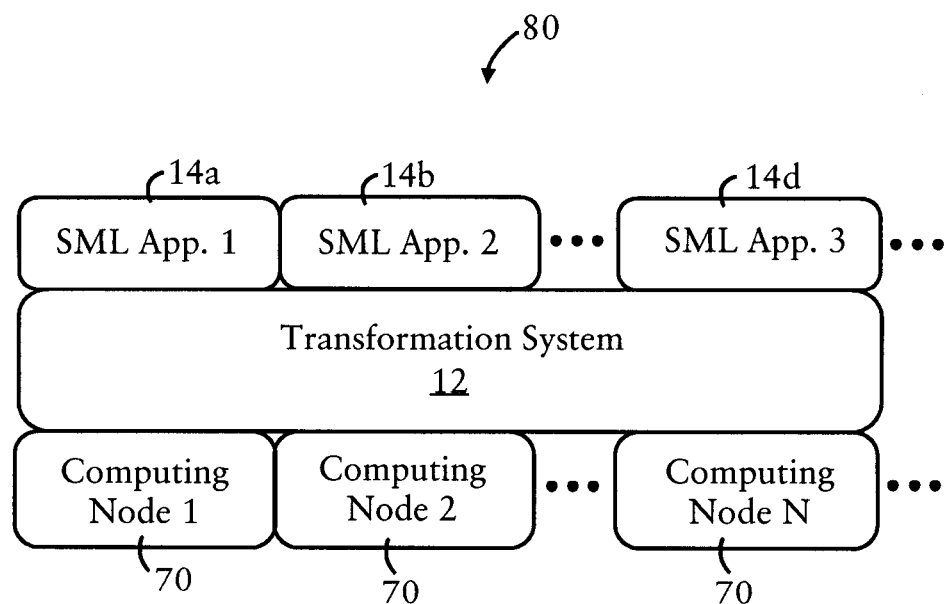
FIG. 3 illustrates execution of multiple SML applications by a distributed computing system having multiple computing nodes based on optimization by the transformation system of FIG. 1, according to an example embodiment.

The transformation system 12 can be configured for implementing a fully nondestructive logical transformation in the form of an optimization of the original SML-based application 14 and/or the transformed SML-based application 14' into an executable application 18 (e.g., 18a and/or 18b) based on prescribed hardware and/or software-specific requirements 20 (e.g., 20a and/or 20b) of a prescribed computing system deployment model (e.g., a distributed computing system 80 containing two or more computing nodes 70 as in FIG. 3). The executable application 18 generated by the transformation system 12 can include hardware and/or software-specific executable code 22 (e.g., 22a, 22b) optimized for the prescribed computing system deployment model. The executable application 18 also can include SML program elements 24 (e.g., 24a and/or 24b) that describe respective application function operations independent of any hardware or software-specific requirements of any computing system deployment model, and that are implemented by an SML program interpreter executed by the prescribed computing system deployment model.

I.B The Symbol Manipulation Language

FIG. 4 illustrates example attributes of the symbol manipulation language 16, according to an example embodiment. The symbol manipulation language 16 provides a logical specification for describing functions to be executed in a computing system deployment model, independent of any hardware-specific or software-specific requirements of any computing system deployment model. The symbol manipulation language 16 is a non-Turing complete language. Formally, the symbol manipulation language is a total functional language and does not permit partial functions. Unlike Turing-complete languages, all functions described in the symbol manipulation language 16 must return a result, i.e., no function described by the symbol manipulation language 16 is permitted to be executed without generating a result. Hence, Turing-complete functions that are capable of not generating a result (e.g., functions such as creation of an infinite loop, a branch to another location and that does not return, or a "do-while" that loops indefinitely) are considered "bottom" and are not permitted in the symbol manipulation language 16. A halt operation, required in Turing complete languages, also is not permitted in the symbol manipulation language 16.

In addition to the SML language 16 being a non-Turing complete and purely functional language, the SML language 16 also should be a higher-order language; the language 16 must be a strong and statically typed language: a language is "statically" typed only if all expressions have their types determined prior to execution of the application (e.g., determined during compilation); a language has a "strong typing" (i.e., strongly typed definitions) if the language does not permit one type to be treated as another type (e.g., treating an integer type as a string type). The symbol manipulation language 16 also must support "symbols" 26: a symbol 26 is a unique element (e.g., as in the Scheme programming language) that can be stored in one or more physical and tangible data structures (e.g., stored within at least one non-transitory storage medium 44) and that can be compared with another symbol. The symbol manipulation language 16 also must support the following operations by providing the appropriate syntactic rules 28: Pair and Projection operations (for constructing and destructing tuples, described below); Tagged-Union and Case operations (for constructing and destructing union structures); Curry and Apply operations (for constructing and destructing new functions); Identity and Composition operations (for building complex operations from simpler ones).

The symbol manipulation language 16 also can provide support for Monads, Functors, Inductive and CoInductive types, Catamorphisms, and Anamorphisms. Example programming languages that can be used to implement the disclosed symbol manipulation language 16 can include Charity, Joy, and subsets of Standard ML, Scheme, and Haskell. In one embodiment, the symbol manipulation language 16 can be implemented using a subset of Haskell.

The symbol manipulation language 16 provides a logical specification for describing functions to be executed in a computing system, in that the symbol manipulation language serves as a metalanguage for functions based on describing the semantics (i.e., the meanings) of the functions. In particular, a function is a transformation of one and only one input to one and only one output: as described below, an "input" and/or an "output" may be composed of multiple symbols 26, for example a "pair" as an input (e.g., a & b→c) or a "pair" as an output (e.g., a→(b & c)). The symbol manipulation language provides a logical specification for the description of the function, without describing the input or the output. In particular, the functional relationship between inputs and outputs can be described in terms of logical "types", according to foundational mathematics, universal algebra and category theory: example logical types include at least a tuple, a sum, and a lambda type.

As described in further detail below, a given symbol 26 can be used to represent a particular value independent of form. In other words, a symbol 26 in one example represents a particular value that can be implemented as any one of an integer, string (alphanumeric), Boolean value (e.g., a bitmask), floating point, etc., without explicitly identifying the symbol as any one of the integer, string, Boolean value, floating point, etc. Note, however, that a symbol 26 is not a variable, because the value of a symbol 26 does not change: a symbol 26 is only ever one value, while a variable is some class of values, of which the variable currently is assigned one value at a time. Hence, a reference to an alphanumeric letter in this specification in quotes (e.g., "a") refers to a symbol 26, and not a variable, unless explicitly identified otherwise as a "variable".

Hence, the symbols "a" and "b" 26 in an expression can be used to express the relationship between "a" and "b", without identifying whether any one of the symbols is implemented as an integer, string, Boolean value, floating point, etc.

A tuple is a pairing (or association) between one symbol "a" and another symbol "b", for example enabling description of a function that maps from the inputs "a and b" (i.e., (a & b)) to an output: the inputs "a" and "b" can be of the same type (e.g., "a" is an integer and "b" is an integer) or different types (e.g., "a" is an integer and "b" is a floating point). A sum (i.e., coproduct) identifies a relationship between one symbol "a" and another symbol "b", for example enabling description of a function that maps an input "a or b" (i.e., a I b) to an output, where the inputs "a" and "b" can be either the same or different types; a sum also can be used to describe a conditional operation (e.g., "if . . . then").

A lambda type ($\lambda$) changes an existing function into a new function. The existing function (serving as an input to the lambda type) takes one pair as input and returns one output (a & b→c). The new function (output by the lambda type) takes one value as input, and returns a new function as output (a→(b→c)). The use of lambda types is the foundation for typed lambda calculus (excluding untyped lambda calculus).

These example logical types (tuples, sums and lambda types) can be used to derive additional functions or operations that combine symbols, for example products, exponentials, etc.

Hence, the symbol manipulation language 16 provides a logical and semantic specification for describing functions independent of any hardware-specific or software-specific requirements of any computing system, based on the tuple, sum, and lambda types that define the relationships between the symbols 26 that are manipulated by the functions. Category theory provides that repeating patterns can be described in a manner that is mathematically provable: the symbol manipulation language 16 is established based on defining a base category of symbols 26, and adding to the base category tuples, sums, and lambda types and other (optional) logical types that describe the functions to be performed.

By way of analogy, consider the construction of a building structure, for example a commercial office building or a home: the application written according to the prescribed symbol manipulation language is analogous to an architect's blueprint plan that can illustrate (graphically and with textual annotations) the structure of the building based on including plan views (e.g., floor plan views), elevation views, and/or cross-sectional views, without any details as to the specific construction techniques for implementing the blueprint plan. In other words, the same blueprint plan can be used to build the same building structure using different construction techniques, depending on the time the building structure is built or the particular building codes in effect at the building site.

Consequently, an application written according to a prescribed symbol manipulation language 16 as described herein is independent of any hardware and/or software-specific requirements of a prescribed computing system deployment model such as: explicit memory allocation, persistent storage, serial ordering constraints, messaging, threading, shared state, hardware access, operating system interaction, or real-time clocks. The symbol manipulation language 16 also is isolated from any and all interactions with any hardware or software attributes of the computing system deployment model, and isolated from any notion of the forward progression of time (e.g., as in runtime execution of an executable resource by the computing system).

In addition, since the symbol manipulation language 16 is based on category theory (which can provide mathematically-provable descriptions of repeating patterns), absolute backwards compatibility is guaranteed between a first application and a newer application. In particular, assume the first application is written in a first symbol manipulation language having an initial set of logical types. Assume further the newer application is written in a later symbol manipulation language having an expanded set of logical types that includes the initial set of logical types and newly added logical types having been discovered according to category theory. Category theory ensures that the first application written in the first symbol manipulation language is compatible with the newer application written in the later symbol manipulation language because the first symbol manipulation language is mathematically consistent with the later symbol manipulation language.

The application 14 written according to the prescribed symbol manipulation language 16 can be executed on any computing system deployment model based on execution of the application 14 by an interpreter that is native to the corresponding computing system deployment model (i.e., the interpreter is specific to the hardware and/or software requirements of the corresponding computing system deployment model).

Figure 2:
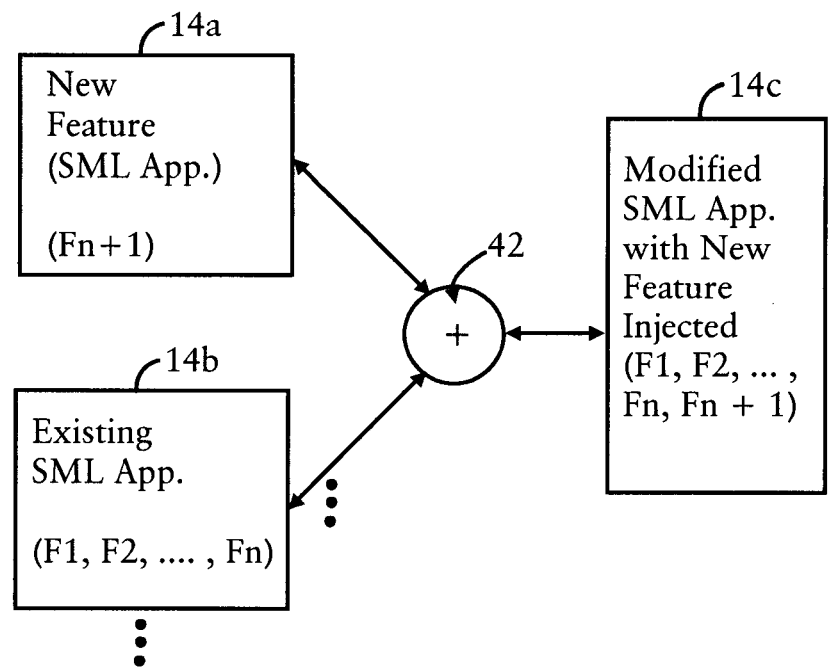
FIG. 2 illustrates an example combining example SML applications into a modified SML application, and splitting the modified SML application into multiple SML application components, according to an example embodiment.

As illustrated in FIG. 2 and described in further detail below, new features can be injected based on the transformation system 12 injecting a new application 14a containing the new feature (e.g., feature "Fn+1") into an existing application 14b having existing features "e.g., "F1, F2, . . . , Fn"), and executing the super-optimization 42 for generation of the modified application 14c containing the existing features and the new feature (e.g., "F1, F2, . . . , Fn, Fn+1").

As described in further detailed below, each original version of an SML application 14 can be retained (e.g., in the storage 44); hence, the original version of an SML application 14 can be recompiled into new variants at any time, for example as new equality axioms 30, new primitive type sets 20, and/or new program fragments (e.g., 14a of FIG. 2) become available. Since the combination of the SML application 14a with the SML application 14b is semantically equivalent to the modified application 14c, and since the original versions of the SML applications 14a and 14b also can be retained by the transformation system 12, the transformation system 12 also can effectively split the modified application 14c into the original application components 14a and 14b, or any variation thereof (including tens, hundreds, thousands, etc. of application components 14 and/or replicas thereof) as desired depending on the preferred optimization for a given computing system deployment model (e.g., client/server computing, peer to peer computing, distributed computing, cloud computing, etc.).

The injecting, splitting, and/or replicating of an application 14 by the compilation and execution infrastructure of the transformation system 12 enables the transformation system 12 to build a distributed transaction processor (similar to a relational database system), and enables the transformation system 12 to provide a series of efficiency improvements based on relevant optimization operations.

I.C. A Distributed Services Engine

The compiler circuit 38 can be implemented based on batch-processing a single source SML application 14 into a single executable application 18. The compiler circuit 38 also can be implemented as a complete distributed services engine based on the compiler circuit 38 including an evaluator circuit 60, illustrated in FIG. 1.

The compiler circuit 38 and the evaluator circuit 60 in combination can immediately compile and evaluate incoming program fragments (e.g., 14 of FIG. 1 and/or 14a of FIG. 2). Results from the immediate compiling and evaluating of the incoming program fragments (e.g., 14 and/or 14a) can be returned to a submitting client device either as a transformed application (e.g., 14' of FIG. 1) or as part of a modified application (e.g., 14c of FIG. 2) based on the incoming program fragment (14a of FIG. 2) and another existing SML application (14b of FIG. 2). Since results can contain functions as well as values, the transformation system 12 can implement behaviors needed for distributed services.

I.F.1. Evaluator

The evaluator circuit 60 can implement a runtime infrastructure required to execute an SML application 14 compiled according to the symbol manipulation language 16 and associated constraints 32, 34, and is analogous to a C runtime library, or a Java Virtual Machine. The evaluator circuit 60 for the SML 16 is configured for providing a non-destructive association with the hardware-specific and/or software-specific attributes of the computing system deployment model that are required for execution of the SML application 16, example attributes including: memory management, persistence, networking, etc.

The evaluator circuit 60 can be implemented using any programming language (including SML 16). The evaluator circuit 60 also can be supplied a program (e.g., SML application 14) in a form of byte code, or statically linked with the program (e.g., 14) as a native library that is loaded and executed by the compiler circuit 38 during the compilation process. Executable programs used to implement the evaluator circuit 60 can be general such that they work on any hardware or software platform, or specially designed and implemented (e.g., as a hardware-based logic circuit such as an application specific integrated circuit (FPGA)) for a particular platform or purpose.

At a minimum, any executable application 14 for a given computing system deployment model that is used to implement the evaluator circuit 60 must provide a primitive set 20 that establishes a nondestructive equivalence between native versions (i.e., hardware and/or software specific expressions) of each primitive in the SML language 16, enabling all programs 14 to work with all evaluator circuits 60. Beyond this minimum, an evaluator circuit 60 can expose additional primitives, such as threading, vector processing, persistent storage, databases, networking, or other platform-specific features, described below in further detail in Section II. These features can be used when associated equality axioms 30 and metrics 40 are provided to the compiler circuit 38.

Thus, an SML application 14 compiled for an evaluator circuit 60 with persistence can cause the evaluator circuit 60 to store or retrieve data from a storage medium 44 during the computation of its results. The same SML application 14 compiled for an evaluator circuit 60 with networking could operate as a distributed computation.

I.F.2. Native Compilation

As described previously, the compiler circuit 38 can be configured for generating native code 22 for any platform, given the appropriate axioms 30 and metrics 40. The disclosed compiler circuit 38 has been demonstrated in experimental testing to compete favorably against expert human optimizations (i.e., manual optimizations), and to balance factors that are often overlooked (power efficiency, code size vs. execution speed, RF interference modeling, etc).

II. GEOSPATIAL LANGUAGE STACK HAVING SEGREGATED LANGUAGE PRIMITIVES

Figure 6:
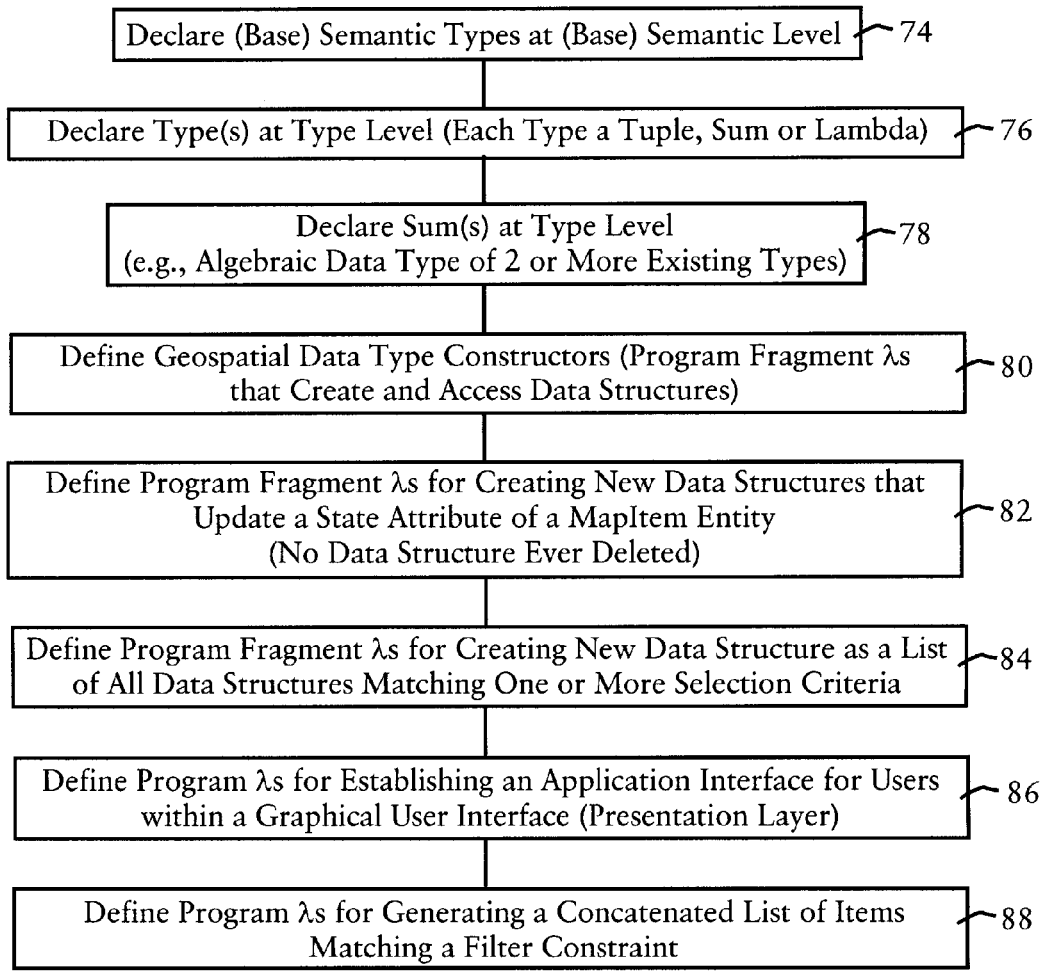
FIG. 6 illustrates establishment of the strongly typed definitions for the elements of an example geospatial application, according to an example embodiment.

FIGS. 5 and 6 illustrate a typing hierarchy used to establish strongly typed definitions for elements (e.g., data structures, lambda functions) of a geospatial application, according to an example embodiment. As described in further detail with respect to Table 1, all elements of the SML-based geospatial application 14 are strongly typed: as described previously, a language has a "strong typing" (i.e., strongly typed definitions) if it does not permit one type to be treated as another type (e.g., treating an integer type as a string type). Hence, all elements of the geospatial application (including data elements, tuples, sums, and lambda functions) are precisely defined according to type theory. The use of multiple layers as illustrated in FIGS. 5 and 6 enables an application of strict and precise definitions to entities defined using structural type construction (e.g., combinations of existing types) and that provide a layer of abstraction that maintains compliance with the strict definitions at the type level.

For example, FIG. 5 illustrates a base semantic/term level 72a for defining semantics for basic terms of the geospatial application 14, including individual terms, tuples, sums, and lambdas. A "Term" is a sequence of syntactic elements (e.g., characters, glyphs) with no interpretation. "Terms" are sequences of characters and/or glyphs (i.e., non-verbal symbols conveying information) composed of prescribed allowable language syntax (e.g., letters, spaces, parenthesis, comma, digits, etc.). Example definitions at the semantic level 72a in the geospatial application 14 illustrated in Table 1 below include "String" and "Integer". For example, the term level may have the character sequences (shown in quotes) "Foo", "(b,c)" "(\a→a+)", each of which are only sequences of characters (and/or glyphs) that must satisfy a Term definition, for example the definition of a String (e.g., "Foo"), Integer, Tuple (e.g., "(b,c)") or Lambda (e.g., "(\a→a+1)"). Hence, no term can exist in the geospatial application 14 unless it is either explicitly defined at the semantic/term level 72a, or derived based on structural type construction using a combination of other terms explicitly defined at the semantic/term level 72a. In some cases, characters may satisfy multiple sets of constraints: for example, the sequence "10" could be interpreted as an integer, a floating point decimal value, or a two-bit sequence. Hence, typing discipline is implemented using strongly typed definitions that enforce one and only one meaning to the sequence of characters, thereby eliminating unintended meanings.

The type level 72b specifies precisely defined Types. A Type is a set of constraints on Terms to define some domain-specific meaning. In other words, a type is defined by one and only one precisely defined meaning. For example, a Type defined as "Integer" recognizes a contiguous sequence of digits without decimal points as a decimal (base Ten) value. Hence, a Term is of some Type if and only if the Term satisfies the constraints of the Type. Types are distinct from syntax, as types in general cannot be defined by the structure of the syntax. Example types defined in the geospatial application of Table 1 include "Name", "Email", "Phone", "IpAddr", etc. A type may contain a variable, in which the type can be fully determined as belonging to a predefined type (a "concrete type") once the variable is filled with a value.

Structural type construction enables types to be defined as combinations of existing types; in contrast, a monomorphic type is a type that is defined by one and only one type. In this specification, the terms "sum" and "coproduct" are equivalent and interchangable. A sum can be a type that is defined as a structural composition at the type level 72b that is derived from other types in the type level 72b: sums also are referred to as "Algebraic Data Types". Algebraic data types are a hierarchical combination of coproducts (i.e., sums) and products. Algebraic data types can be illustrated in the form of a tree, where a given coproduct forms the root of the tree. For example, the root coproduct "Item" 90h can branch to any one of the products of type Person 90a, Media 90b, RFid 90c, Inline 90d, Video 90g, or Name 90j. Each node that branches from the coproduct "Item" 90h in turn also can be defined as a coproduct containing one or more products. For example, the coproduct "Person" 90a (within the subtree rooted by the root coproduct "Item" 90a) can be defined as containing the products "Name" 90j, "Email", "Phone", and "IpAddr", each of which has a strongly typed semantic definition as a string.

Hence, the strongly typed definitions of tuples, sums, and/or lambda functions guarantee that each of the tuples, sums, and lambda functions so defined can be represented in the form of a tree: if any tuple, sum, or lambda function (TSM) cannot be represented in the form of a tree structure, the TSM is deemed not to have a strongly typed definition.

Hence, a type (e.g., "Person" in Table 1) can be defined as a structural composition of existing types, a form of abstraction independent from the type hierarchy. Note, however, that a type defined as a structural composition of existing types is distinct and not synonymous with its structural counterparts; hence a Name-type could be defined to be a string, however a String cannot be passed where a Name is required, except for unique Name-type constructor.

The kind level 72c provides definitions for "Kinds". A "Kind" is a set of constraints on "Types". For example, all term-level types are of the unique Kind "*", while the advanced Kind "*→*" is a function that takes one type and return a new type (e.g., generating a list). For example, a list is a Kind which takes any type "X" and returns a new type which is a "list of X". The Kind "*→*" is not a Type. A Type cannot have Kind "*→*", it must have kind "*". Hence, if the list-generating Kind "*→* is applied to a Type (e.g., Integer), the result is a Type "list of Integer", and since it is a Type, its Kind is "*". A Kind is sometimes referred to as a "type of types", however since types cannot process themselves a function from some type to some type "*→*" cannot be a Type, it must be a Kind.

A sort defined at the sort level 72d is a "type of Kinds". A Kind that contains a variable requires a sort over the Kinds. Sorts can contain a single concrete object (typically represented with a box symbol "□"), and the function type over kinds ("□→□").

The use of the typing hierarchy of FIG. 5 enables strongly typed definitions to be established for elements of a geospatial application 14, while maintaining flexibility for newly added elements to the geospatial application 14. In particular, new elements can be added by creating a new type, and semantically combining the new type with another existing type to form a new sum (i.e., coproduct): creating a new type is preferable to redefining the existing type, as any attempt to redefine any existing element can have substantial ramifications if a new definition were to be applied to an existing type in an existing SML application. Hence, the typing hierarchy of FIG. 5 provides flexibility for new types while ensuring semantic compliance with existing types.

FIG. 6 illustrates implementing strongly typed definitions for elements (e.g., data structures, lambda functions) in a geospatial application, according to an example embodiment. The steps of FIG. 6 are illustrated with respect to the example geospatial application 14 specified in Table 1.

III. EXAMPLE SML APPLICATION: GEOSPATIAL APPLICATION

Table 1 illustrates an example application 14, written according to the SML language 16 and implemented using the T programming language, that describes an example geospatial application 14 that includes an execution layer and a user interface 36 of FIG. 1. As described previously, the transformation system 12 can be configured for transforming the SML-based geospatial application in Table 1 into an SML-based executable application that can be optimized for a prescribed computing system deployment model.

Table 1 illustrates that the geospatial application 14 specifies strongly typed definitions (i.e., strongly typed declarations) for all data structures and functions, including declarations of primitives (e.g., categorical primitives, primitive functions). For example, the categorical primitive "fst" returns the first item in a tuple, and the categorical primitive "snd" returns the second item in a tuple; the combinators primitive "const" returns a constant, the combinators primitive "id" is an identity function, etc. Table 1 also illustrates manipulation of tuples, sums, and lambdas using curry and uncurry operations according to lambda calculus. A curry operation can deconstruct a function having multiple inputs into an equivalent function that accepts only a single input, and as output the equivalent function returns another function that accepts only a single input, etc.

A detailed description of the geospatial application in Table 1 follows immediately after the listing of the geospatial application.

TABLE 1

Example Program Listing for GeoSpatial Application

```
-------------------------------
-- Geo-Spatial Collaboration --
-------------------------------
-- Written in 'T' language for
-- a model-driven distributed-
-- computing architecture.
-------------------------------
---------------
-- Data Types
--
-- Assign unique types to some commonly used data.
data Name     = Name     String;
data Email    = Email    String;
data Phone    = Phone    String;
data IpAddr   = IpAddr   String;
data Url      = Url      String;
data Mime     = Mime     String;
data MacAddr  = MacAddr  String;
data PosX     = PosX     Integer;
data PosY     = PosY     Integer;
data PosZ     = PosZ     Integer;
data Width    = Width    Integer;
data Height   = Height   Integer;
data Person   = Person   (Name, Email, Phone, IpAddr);
data Media    = Media    (Name, Mime, Url);
data Rfid     = Rfid     (MacAddr, Name, String, String);
data Location = Location (PosX, PosY, PosZ);
data Scale    = Scale    (Width, Height);
data Inline   = Inline   (Media, Scale);
data Video    = Video    (Name, String, IpAddr);
---------------------
-- Application Types
--
data Item     = PersonItem   Person
              | MediaItem    Media
              | RfidItem     Rfid
              | InlineItem   Inline
              | VideoItem    Video
              | StringItem   Name;
data MapItem = MapItem (Item, Location);
data MapItemEntity =   MapItemEntity (Integer, MapItem
                       , (PosX -> PosY -> Void)    -- MoveTo
                       , (PosX -> PosY -> Void)    -- Offset
                       , (Name -> Void)            -- Rename
                       , (PosZ -> Void)            -- SetZ
                       );
data PersonMiEntity =  PersonMiEntity (Integer, MapItem
                       , (PosX -> PosY -> Void)    -- MoveTo
                       , (PosX -> PosY -> Void)    -- Offset
                       , (Name -> Void)            -- Rename
                       , (PosZ -> Void)            -- SetZ
                       , (Email -> Void)           -- Change Email
                       , (Phone -> Void)           -- Change Phone
                       , (IpAddr -> Void)          -- Change IpAddr
                       );
data MediaMiEntity =   MediaMiEntity (Integer, MapItem
                       , (PosX -> PosY -> Void)    -- MoveTo
                       , (PosX -> PosY -> Void)    -- Offset
                       , (Name -> Void)            -- Rename
                       , (PosZ -> Void)            -- SetZ
                       , (Url -> Void)             -- Change Url
                       );
data InlineMiEntity =  InlineMiEntity (Integer, MapItem
                       , (PosX -> PosY -> Void)    -- MoveTo
                       , (PosX -> PosY -> Void)    -- Offset
                       , (Name -> Void)            -- Rename
                       , (PosZ -> Void)            -- SetZ
                       , (Width -> Height -> Void) -- Change Scale
                       );
data Template = Template (Name, String);
-- Tag Relations?
--                entityID tag
--data PersonTag  = (Integer, Tag)
```

TABLE 1-continued

Example Program Listing for GeoSpatial Application

```
--data MediaTag    = (Integer, Tag)
--data RFIDTag     = (Integer, Tag)
------------------------------------
-- GeoSpatial Data Type Constructors
let
    --------------------
    -- Data type constructor and accessor functions
    -- Location
    makeLocation x y z = Location (x, y, z);
    position_x loc = case loc of Location tp -> (Fst tp);;
    position_y loc = case loc of Location tp -> (Fst (Snd tp));;
    position_z loc = case loc of Location tp -> (Snd (Snd tp));;
    intX a = case a of PosX x -> x;;
    intY a = case a of PosY y -> y;;
    intZ a = case a of PosZ z -> z;;
    plusX a b = PosX (plus (intX a) (intX b));
    plusY a b = PosY (plus (intY a) (intY b));
    plusZ a b = PosZ (plus (intZ a) (intZ b));
    -- Person
    makePerson name email phone ipaddr = Person (name, email, phone, ipaddr);
--     personName (Person (Name n,_,_,_)) = n        -- Preferred syntax.. (pattern match on person structure)
    personName    person = case person of Person tpl -> (Fst tpl);;
    email         person = case person of Person tpl -> (Fst (Snd tpl));;
    phone         person = case person of Person tpl -> (Fst (Snd (Snd tpl)));;
    personIpAddr  person = case person of Person tpl -> (Snd (Snd (Snd tpl)));;
    -- Media
    makeMedia title mime url = Media (title, mime, url);
    makeMediaStr title mime url = makeMedia (Name title) (Mime mime) (Url url);
    title   media = case media of Media tpl -> (Fst tpl);;
    mime    media = case media of Media tpl -> (Fst (Snd tpl));;
    url     media = case media of Media tpl -> (Snd (Snd tpl));;
    -- Rfid
    makeRfid mac name group category = Rfid (mac, name, group, category);
    macAddr   rfid = case rfid of Rfid tpl -> (Fst tpl);;
    rfidName  rfid = case rfid of Rfid tpl -> (Fst (Snd tpl));;
    group     rfid = case rfid of Rfid tpl -> Fst (Snd (Snd tpl));;
    category  rfid = case rfid of Rfid tpl -> Snd (Snd (Snd tpl));;
    -- Scale
    makeScale     width height = Scale (width, height);
    makeScaleInt width height = makeScale (Width width) (Height height);
    width  scale = case scale of Scale tpl -> (Fst tpl);;
    height scale = case scale of Scale tpl -> (Snd tpl);;
    -- InlineMedia
    makeInline media scale = Inline (media, scale);
    media inline = case inline of Inline tpl -> (Fst tpl);;
    scale inline = case inline of Inline tpl -> (Snd tpl);;
    -- Video
    makeVideo name brand ipaddr = Video (name, brand, ipaddr);
    videoName   video = case video of Video tpl -> (Fst tpl);;
    brand       video = case video of Video tpl -> (Fst (Snd tpl));;
    videoIpAddr video = case video of Video tpl -> (Snd (Snd tpl));;
    -- Item
    makePersonItem  person  = PersonItem   person;
    makeMediaItem   media   = MediaItem    media;
    makeRfidItem    rfid    = RfidItem     rfid;
    makeInlineItem  inline  = InlineItem   inline;
    makeVideoItem   video   = VideoItem    video;
    makeStringItem  str     = StringItem   str;
    itemCase item pfunc mfunc rfunc ifunc vfunc sfunc
              = case item of
                        PersonItem  a -> pfunc a;
                        MediaItem   a -> mfunc a;
                        RfidItem    a -> rfunc a;
                        InlineItem  a -> ifunc a;
                        VideoItem   a -> vfunc a;
                        StringItem  a -> sfunc a;;
    -- MapItem
    makeMapItem item loc = MapItem (item, loc);
    item     mapItem = case mapItem of MapItem tpl -> Fst tpl;;
    location mapItem = case mapItem of MapItem tpl -> Snd tpl;;
```

TABLE 1-continued

Example Program Listing for GeoSpatial Application

```
{-
--------------------
-- Build Generic Entity Structures
    makeEntity -- ::(Integer -> MapItem -> a -> Entity)
        eid::Integer
        mapItem::MapItem
        funcs = (eid, mapItem, funcs);
    firstFn    ntt::(Integer,MapItem,a)    = Snd (Snd ntt);
    nextFn    fnz::(a,b)                    = Snd fnz;
-}
--------------------
-- MapItem Entity
        ---------------------
        -- These are the state transition functions for the "MapItem"
state machine.
        --    Given the current state, and parameters for updating it,
build the updated state.
        doMoveTo --  ::(PosX -> PosY -> MapItem -> MapItem)
                    x::PosX
                    y::PosY
                mapItem::MapItem
                    =
                    let    loc  {-::Location-}    = location mapItem;
                           z    {-::PosZ-}        = position_z loc;
                           it   {-::Item-}        = item mapItem;
                           ne   {-::Location-}    = makeLocation x y z;
                    in
                        makeMapItem it ne;
        doOffset        x::PosX
                        y::PosY
                    mapItem::MapItem
                        =
                        let
                            loc      {-::Location -}  = location mapItem;
                            old_x    {-::PosX-}       = position_x loc;
                            old_y    {-::PosY-}       = position_y loc;
                            new_x    {-::PosX-}       = plusX x old_x;
                            new_y    {-::PosY-}       = plusY y old_y;
                            z        {-::PosZ-}       = position_z loc;
                        in
                            makeMapItem (item mapItem) (makeLocation
new_x new_y z);
        doSetZ        = (\z mapItem ->
                    let   loc        = location mapItem;
                          x          = position_x loc;
                          y          = position_y loc;
                    in
                        makeMapItem (item mapItem) (makeLocation x
y z));
        doRename    new -- ::Name
                    mapItem {-::MapItem-} =
                        makeMapItem
                            (itemCase (item mapItem)
                                (\person  -> makePersonItem  (makePerson
new (email person) (phone person) (personIpAddr person)))
                                (\media   -> makeMediaItem  (makeMedia
new (mime media) (url media)))
                                (\rfid    -> makeRfidItem    (makeRfid
(macAddr rfid) new (group rfid) (category rfid)))
                                (\inline  -> makeInlineItem  (makeInline
(makeMedia new (mime (media inline)) (url (media inline)))
(scale inline)))
                                (\video   -> makeVideoItem  (makeVideo
new (brand video) (videoIpAddr video)))
                                (\str     -> makeStringItem new)
                                )
                                (location mapItem);
        ---------------------
        -- API for MapItem Objects
        --
        getId ntt{-::MapItemEntity-} = case ntt of MapItemEntity tpl ->
Fst tpl;;
        entity ntt{-::MapItemEntity-} = case ntt of MapItemEntity tpl ->
Fst (Snd tpl);;
        moveTo eid::Integer x::PosX y::PosY = UpdateMapItem (doMoveTo x y,
Eid eid);
        offset eid::Integer x::PosX y::PosY = UpdateMapItem (doOffset x y,
Eid eid);
```

TABLE 1-continued

Example Program Listing for GeoSpatial Application

```
    rename eid::Integer new::Name = UpdateMapItem (doRename new, Eid
eid);
    setZ    eid::Integer z::PosZ     = UpdateMapItem (doSetZ    z   , Eid
eid);
    ---------------------
    -- This builds a "MapItem" state machine, given the entity ID and
a reference state
    --    (the reference state is not used as the base for updates;
updates are made to the database version directly)
    makeMapItemEntity
                        eid         ::Integer
                        mapItem     ::MapItem
                        {-funcs-} = MapItemEntity (eid, mapItem, moveTo eid,
offset eid, rename eid, setZ eid {-, funcs-});
    ---------------------
    entityMapItem {-::(Integer -> MapItem)-}
                  eid {-::Integer-} = EntityMapItem (Eid eid);
    allEntityMapItem _   = map (\pr -> makeMapItemEntity (Fst pr) (Snd
pr) {-Null-}) (AllEntityMapItem);
    allEntityHistoryMapItem _ = map (\tupl -> let -- Flatten
Historical items into an Entity List
                            eid    = Fst tupl;
                            entry  = Fst (Snd
tupl);
                            time   = Fst (Snd (Snd
tupl));
                            ntt    = Snd (Snd (Snd
tupl));
                        in makeMapItemEntity eid
ntt {-Null-}) (AllEntityHistoryMapItem);
    ---------------------
    setZFromTop eid offZ {-::Integer-} = let
                    lst = AllEntityMapItem;
                    max = catalist 0 (\pr {-
-::((Integer,MapItem),Integer)-} ->
                        let
                            mi  {-::MapItem-}   = Snd (Fst pr);
                            loc {-::Location-}  = location mi;
                            curZ{-::Integer-}   = intZ
(position_z loc);
                            max {-::Integer-} = Snd pr;
                        in  cond (\_ -> gt curZ max) ((\_ ->
curZ), (\_ -> max)) 0) lst;
                    newZ = plus max offZ;
                in setZ eid (PosZ newZ);
---------------------
-- Person Entity
    doNewEmail      = (\new mapItem ->
                        makeMapItem
                            (itemCase (item mapItem)
                                (\person -> makePersonItem
(makePerson (personName person) new (phone person) (personIpAddr
person)))
                                makeMediaItem
                                makeRfidItem
                                makeInlineItem
                                makeVideoItem
                                makeStringItem)
                            (location mapItem));
    doNewPhone      = (\new mapItem ->
                        makeMapItem
                            (itemCase (item mapItem)
                                (\person -> makePersonItem
(makePerson (personName person) (email person) new (personIpAddr
person)))
                                makeMediaItem
                                makeRfidItem
                                makeInlineItem
                                makeVideoItem
                                makeStringItem)
                            (location mapItem));
    doNewIpAddr     = (\new mapItem ->
                        makeMapItem
                            (itemCase (item mapItem)
                                (\person -> makePersonItem
(makePerson (personName person) (email person) (phone person) new))
                                makeMediaItem
                                makeRfidItem
```

TABLE 1-continued

Example Program Listing for GeoSpatial Application

```
                                    makeInlineItem
                                    makeVideoItem
                                    makeStringItem)
                            (location mapItem));
    changeEmail   eid::Integer new::Email   = (UpdateMapItem)
((doNewEmail new), (Eid eid));
    changePhone   eid::Integer new::Phone   = (UpdateMapItem)
((doNewPhone new), (Eid eid));
    changeIpAddr eid::Integer new::IpAddr = (UpdateMapItem)
((doNewIpAddr new), (Eid eid));
    pmeMoveTo          ntt = case ntt of PersonMiEntity tpl -> Fst (Snd
(Snd tpl));;
    pmeOffset          ntt = case ntt of PersonMiEntity tpl -> Fst (Snd
(Snd (Snd tpl)));;
    pmeRename          ntt = case ntt of PersonMiEntity tpl -> Fst (Snd
(Snd (Snd (Snd tpl))));;
    pmeSetZ            ntt = case ntt of PersonMiEntity tpl -> Fst (Snd
(Snd (Snd (Snd (Snd tpl)))));;
    pmeChangeEmail     ntt = case ntt of PersonMiEntity tpl -> Fst (Snd
(Snd (Snd (Snd (Snd tpl))))));;
    pmeChangePhone     ntt = case ntt of PersonMiEntity tpl -> Fst (Snd
(Snd (Snd (Snd (Snd (Snd tpl)))))));;
    pmeChangeIpAddr    ntt = case ntt of PersonMiEntity tpl -> Snd (Snd
(Snd (Snd (Snd (Snd (Snd tpl)))))));;
    -- This builds a "MapItemPerson" state machine, given the entity
ID and a reference state
    --      (the reference state is not used as the base for updates;
updates are made to the database version directly)
    makeMapItemPersonEntity :: (Integer -> MapItem -> PersonMiEntity)
                  eid ::Integer
                  mapItemPerson::MapItem =
                          PersonMiEntity (eid, mapItemPerson, moveTo
eid, offset eid, rename eid, setZ eid, changeEmail eid, changePhone
eid, changeIpAddr eid);
---------------------
-- Media Entity
    doNewUrl new mapItem =
                          makeMapItem
                                  (itemCase (item mapItem)
                                          makePersonItem
                                          (\media -> makeMediaItem
(makeMedia (title media) (mime media) new))
                                          makeRfidItem
                                          makeInlineItem
                                          makeVideoItem
                                          makeStringItem)
                            (location mapItem);
    changeUrl eid::Integer new::Url = (UpdateMapItem) ((doNewUrl new),
(Eid eid));
    makeMapItemMediaEntity {-::(Integer -> MapItem -> MediaMiEntity)-}
              eid {-::Integer-}
              mapItemMedia {-::MapItem-} =
                          MediaMiEntity (eid, mapItemMedia, moveTo
eid, offset eid, rename eid, setZ eid, changeUrl eid);
---------------------
-- Inline Entity
    doNewScale     = (\w h mapItem ->
                          makeMapItem
                                  (itemCase (item mapItem)
                                          makePersonItem
                                          makeMediaItem
                                          makeRfidItem
                                          (\inline -> makeInlineItem
(makeInline (media inline) (makeScale w h)))
                                          makeVideoItem
                                          makeStringItem)
                            (location mapItem));
    changeScale eid::Integer w::Width h::Height = (UpdateMapItem)
((doNewScale w h), (Eid eid));
    makeMapItemInlineEntity {-::(Integer -> MapItem ->
InlineMiEntity)-}
              eid {-::Integer-}
              mapItemInline {-::MapItem-} =
                          InlineMiEntity (eid, mapItemInline, moveTo
eid, offset eid, rename eid, setZ eid, changeScale eid);
---------------------
-- Application Functions
    ---------------------
```

TABLE 1-continued

Example Program Listing for GeoSpatial Application

```
    -- Cannonical predicate filter for rectangular regions (curry-
able)
    regionFilter = (\low high loc ->
        let  lx  = (position_x low );
             ly  = (position_y low );
             hx  = (position_x high);
             hy  = (position_y high);
             ox  = (position_x loc );
             oy  = (position_y loc ); in
             (and (and (gte ox lx) (gte oy ly)) (and (lte ox hx) (lte oy
hy)))
        );
--------------------
-- Application Interface
    -----------------------
    -- User Entities
    nowhere   = makeLocation (PosX 0) (PosY 0) (PosZ 0);
    emptyP    = makePerson (Name "Nobody") (Email "") (Phone "")
(IpAddr "");
    emptyPI   = makePersonItem emptyP;
    emptyPMI  = makeMapItem emptyPI nowhere;
    inlineZ   = PosZ 10;
    nonInlineZ = PosZ 100;
    personZ   = PosZ 120;
    -----------------------
    -- Person Entities
    --
    -- Create a new user
    createPersonLoc nam emai phon ipadd loc =
                case ((CreateMapItem) (makeMapItem (makePersonItem
(makePerson nam emai phon ipadd)) loc)) of
                        Fail              -> Eid -1;
                        CreatedEid eid    -> Eid eid;;
    createPerson     = (\nam emai phon ipadd -> createPersonLoc nam
emai phon ipadd (makeLocation (PosX 0) (PosY 0) personZ));
    getPerson eid    = makeMapItemPersonEntity eid (entityMapItem eid);
    newLoginLoc      = createPersonLoc;
    newLogin         = createPerson;
    newLoginStr n e p i = createPerson (Name n) (Email e) (Phone p)
(IpAddr i);
    -- Login an existing user (given an eid); returns copy of current
user structure.
    login            = getPerson;
    logout           = (\eid -> eid);
    isPersonWith {-::((Person -> Truth) -> MapItem -> Truth)-}
p::(Person -> Truth) mi =
                        (itemCase (item mi)
                            p                 -- 'p' is a function from
Person -> Bool
                            (\media   -> False)
                            (\rfid    -> False)
                            (\inline  -> False)
                            (\video   -> False)
                            (\str     -> False));
    isPerson = isPersonWith (\_ -> True);
    getPersonByIp ip {-::String-} = map (\pr ->
makeMapItemPersonEntity (Fst pr) (Snd pr))
                            (filter (\pr -> isPersonWith (\p {-
::Person-} -> eq ip (personIpAddr p)) (Snd pr))
                                (AllEntityMapItem));
    -----------------------
    -- MapItem Entities
    createMapItem mi  =  case ((CreateMapItem) mi) of
                            Fail              -> Eid -1;
                            CreatedEid eid    -> Eid eid;;
    getMapItem    eid =  makeMapItemEntity eid (entityMapItem eid) {-
Null-};
    -----------------------
    -- Media Entities
    createMediaLoc titl mim ur loc =
                case ((CreateMapItem) (makeMapItem (makeMediaItem
(makeMedia titl mim ur)) loc)) of
                        Fail              -> Eid -1;
                        CreatedEid eid    -> Eid eid;;
    createMedia      titl mim ur = createMediaLoc titl mim ur
(makeLocation (PosX 0) (PosY 0) nonInlineZ);
    createMediaStr titl mim ur = createMedia (Name titl) (Mime mim)
(Url ur);
```

TABLE 1-continued

Example Program Listing for GeoSpatial Application

```
        getMedia      eid = makeMapItemMediaEntity eid (entityMapItem eid);
        ------------------------
        -- Rfid Entities
        createRfidLoc mac name group category loc =
                        case ((CreateMapItem) (makeMapItem (makeRfidItem
(makeRfid mac name group category)) loc)) of
                        Fail                    -> Eid –1;
                        CreatedEid eid    -> Eid eid;;
    createRfid mac name group category = createRfidLoc mac name group
category (makeLocation (PosX 0) (PosY 0) nonInlineZ);
    createRfidStr mac name group category = createRfid (MacAddr mac)
(Name name) group category;
        getRfid       = getMapItem;
        isRfidWith p mi {-::MapItem-} = (itemCase (item mi)
                                (\person    -> False)
                                (\media     -> False)
                                p                        -- 'p' is a function from
Rfid -> Bool
                                (\inline    -> False)
                                (\video     -> False)
                                (\str       -> False));
        isRfid = isRfidWith (\_ -> True);
        getTagByMac m = map (\pr -> makeMapItemEntity (Fst pr) (Snd pr) {-
Null-})
                        (filter (\pr -> isRfidWith (\r -> eq m
(macAddr r)) (Snd pr))
                                        (AllEntityMapItem));
        ------------------------
        -- InlineMedia Entities
        createInlineLoc media scale loc =
                        case ((CreateMapItem) (makeMapItem
(makeInlineItem (makeInline media scale)) loc)) of
                        Fail              -> Eid –1;
                        CreatedEid eid    -> Eid eid;;
    createInline media scale = createInlineLoc media scale
(makeLocation (PosX 0) (PosY 0) inlineZ);
    getInline eid = makeMapItemInlineEntity eid (entityMapItem eid);
--      isInlineWith p mi::MapItem = (itemCase (item mi)
--                                      (\person    -> False)
--                                      (\media     -> False)
--                                      (\rfid      -> False)
--                                      p                    -- 'p' is a function
from Inline -> Bool
--                                      (\video     -> False)
--                                      (\str       -> False));
--      isInline = isInlineWith (\_ -> True);
        isInline mi {-::MapItem-} = (itemCase (item mi)
                                (\person    -> False)
                                (\media     -> False)
                                (\rfid      -> False)
                                (\inline    -> True )
                                (\video     -> False)
                                (\str       -> False));
--      getInlineByTitle n = map (\pr -> makeMapItemInlineEntity (Fst .
pr) (Snd . pr) Null)
                        -- (filter (\pr -> isInlineWith (\r -> eq n
(title (media r))) (Snd . pr))
--                                       (AllEntityMapItem));
        ------------------------
        -- Video Entities
        createVideoLoc video loc =
                        case ((CreateMapItem) (makeMapItem (makeVideoItem
video) loc)) of
                        Fail              -> Eid –1;
                        CreatedEid eid    -> Eid eid;;
    createVideo name brand ipaddr = createVideoLoc (makeVideo name
brand ipaddr) (makeLocation (PosX 0) (PosY 0) nonInlineZ);
    createVideoStr name brand ipaddr = createVideo (Name name) brand
(IpAddr ipaddr);
        getVideo      = getMapItem;
        ------------------------
        -- String Entities
        createStringLoc str loc =
                        case ((CreateMapItem) (makeMapItem
(makeStringItem str) loc)) of
                        Fail              -> Eid –1;
                        CreatedEid eid    -> Eid eid;;
    createString str = createStringLoc str (makeLocation (PosX 0)
```

TABLE 1-continued

Example Program Listing for GeoSpatial Application

```
(PosY 0) nonInlineZ);
    getString        = getMapItem;
    ------------------------
    -- Given a list of IDs, use the getter to generate all matching
items and concatenate the resulting list.
    getWithFilter getter {-::(a -> TList b)-} list {-::(TList a)-} =
                catalist Null (\pr -> let
                        id       = Fst pr;
                        lst      = Snd pr;
                        pers     = getter id;          -- Returns a
list of items matching the filter (possibly Null)
                        in cat pers lst) list;         -- Concatenate
the lists of items together
    ------------------------
    -- Given a list of (ID, ARG), and a getter, get all the items and
zip them with the arguments provided
    getAndZipWithFilter -- ::((a -> TList b) -> TList (a,c) -> TList
(a,c))
            getter -- ::(a -> TList b)
            listA {-::(TList (a,c))-} =
                catalist Null (\pr -> let
                        tupl     = Fst pr;
                        lst      = Snd pr;
                        id       = Fst tupl;
                        arg      = Snd tupl;
                        itm      = getter id;          --
Returns a list of items matching the filter (possibly Null)
                        iarg = map (\i -> (i,arg)) itm;    -- Zip
the argument with each item
                        in cat iarg lst) listA;        --
Concatenate the lists of items together
    applyOpToNttList op = catalist Void (\pr -> let
                        tupl     = Fst pr;
                        vod      = Snd pr;
                        ntt      = Fst tupl;
                        arg      = Snd tupl;
                        in op ntt arg);
    hysteresis new_x new_y old_x old_y = let
                        -- Returns True if the new value is within
some distance of the old value
                        --   (ie: True = no change)
                        histX = 130; -- Units are in Inches.
These values were chosen by watching the movement of the OQOs
                        histY = 90; --
under normal conditions in the cube for some minutes.
                        newx     = intX new_x;
                        newy     = intY new_y;
                        oldx     = intX old_x;
                        oldy     = intY old_y;
                        lowx     = minus oldx histX;
                        lowy     = minus oldy histY;
                        highx    = plus oldx histX;
                        highy    = plus oldy histY;
                        in and (and (lte lowx newx) (lte lowy
newy)) (and (gte highx newx) (gte highy newy));
    moveIfNewLoc move ntt newXY = let
                        mi       = entity ntt;
                        loc      = location mi;
                        x        = position_x loc;
                        y        = position_y loc;
                        in cond (\pr -> hysteresis (Fst pr)
(Snd pr) x y)          -- Only update if (x,y) has moved enough.
                                ( (\pr -> Void)
-- If no change, do nothing!
                                , (\pr -> move (getId ntt)
(Fst pr) (Snd pr)))     -- If a change occured, move the item.
                                newXY;
    updatePersonAndRfid listP listR = let
                        updateTags = applyOpToNttList (moveIfNewLoc
moveTo) (getAndZipWithFilter getTagByMac listR);
                        updatePers = applyOpToNttList (moveIfNewLoc
moveTo) (getAndZipWithFilter getPersonByIp listP);
                        in (updateTags, updatePers);
In
```

The GeoSpatial application specified in Table 1 is written in the SML language as described previously. For example, the GeoSpatial application does not express computing system operations to be performed, rather it is written as a specification that describes functions to be performed. Hence, operations such as reading/writing a data structure from/to a memory location, etc., are not specified because operations such as hardware-based attributes associated with memory persistence, memory pointers, data distribution etc. are opaque to the writer of the SML application, rather the SML application describes how data elements are extracted from existing data structures in order to create new data structures.

The GeoSpatial application specified in Table 1 utilizes the following example SML language syntax: a line starting with a double dash "--" denotes a comment; a line starting with "data" denotes a declaration of a data structure; an equal sign "=" denotes "is"; an expression ending with a semicolon ";" denotes an end of the expression; a line starting with a string other than "data" defines the string as a lambda function, where space-separated values following the string denote required input parameters in a required ordering; an expression ending with a double semicolon ";;" denotes a condition; comma-separated items in parenthesis are presented in a required ordering; a dash and arrow "a→b" denotes that the example specified lambda function "a" returns "b"; a vertical line "|" represents a Boolean "OR"; values in parenthesis separated by a dash and arrow (e.g., "(PosX→PosY→Void)" denotes required parameters "PosX" and "PosY" for a lambda function that returns a typeless answer ("Void"), where "Void" is equivalent to a Null operation; a double colon "::" denotes "is of type"; a dash and double colon sign (e.g., "-::" or "--::") denotes "is defined as"; the reference "_" following a specified lambda function indicates that any input can be accepted, and "\pr" is a lambda function indicating an input of any type is accepted so long as the input can be passed to a referenced lambda function. Additional syntax will become apparent from the following description.

FIG. 6 illustrates establishment of the strongly typed definitions for the elements of the geospatial application of Table 1, according to an example embodiment. The geospatial application first relies on semantic and primitive requirements established by the symbol manipulation language 16 and enforced in step 74 by the compiler circuit 38 based on the axiom constraints 32 and system constraints 34 of FIG. 1. Example semantic types at the semantic level include, for example string, integer, etc.

The geospatial application 14 relies on the base semantic types in providing strongly typed definitions for types at the type level in step 76, where each type can be a tuple, a sum, or a lambda function. For example, the data structure "Name" (illustrated in FIG. 7 as within the data structures 90*a*, 90*b*, 90*c*, 90*j*, and/or 90*h*) has a strongly typed definition at the semantic level to be a string, and to be of the type Name; the data structure "PosX" (representing a position in the "x" dimension in an x-y-z coordinate system) has a strongly typed definition at the semantic level to be an integer, and to be of the type "PosX".

Figure 7:
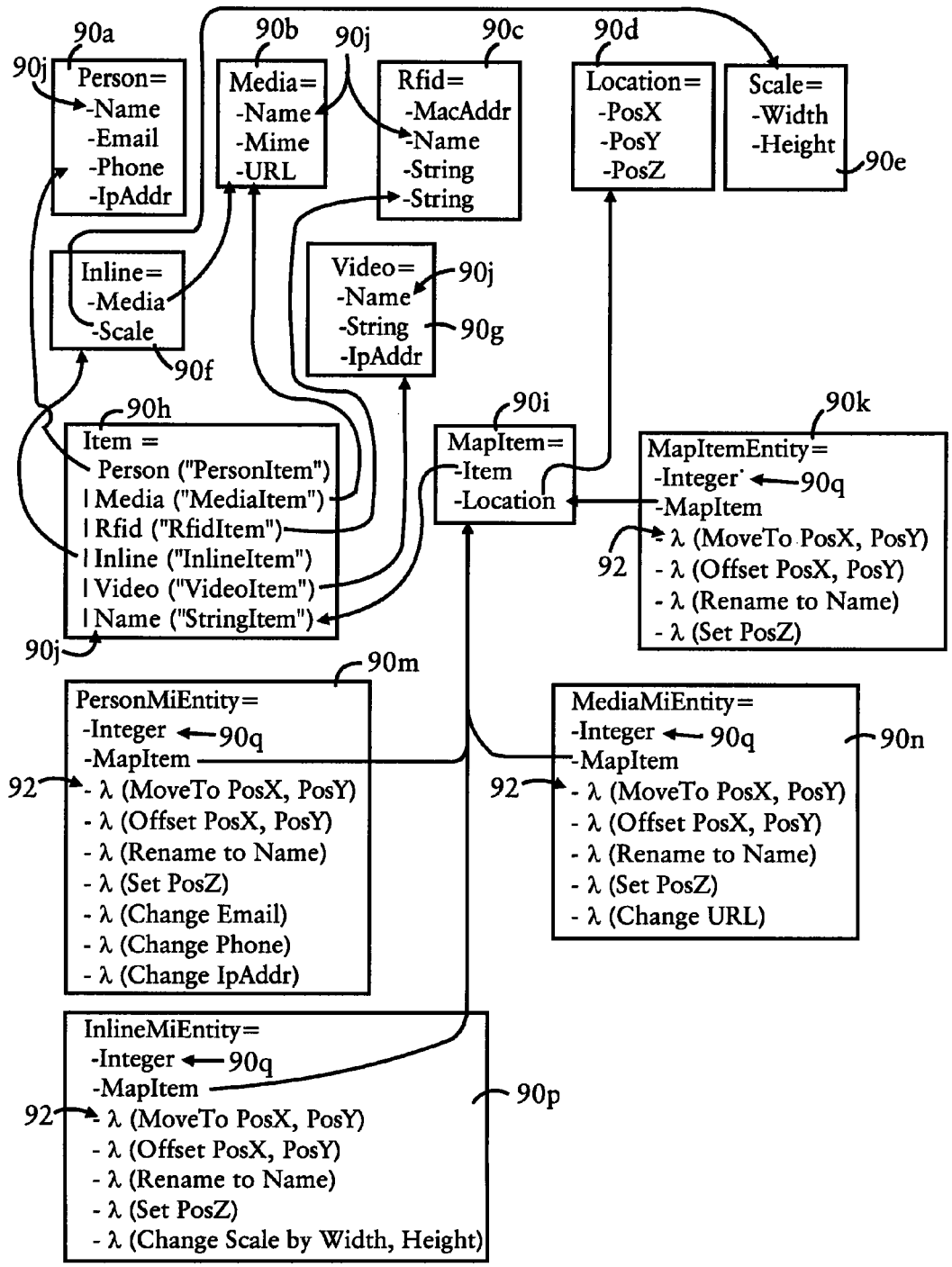
FIG. 7 illustrates example data structures of entities, in an ad hoc geospatial directory of an example geospatial application, strongly typed definitions at the algebraic data type level, according to an example embodiment.

Declarations also can define in step 78 data structures as algebraic data types consisting of predefined types, i.e., strongly typed data attributes associated with an entity such as a user; for example, the data structure "Person" 90*a* of FIG. 7 has a strongly typed definition as a Sum consisting strongly typed data attributes of the predefined types Name, Email, Phone, and IpAddr, that are expressed in the specified order. Additional declarations provide strongly typed definitions of the Sums "Media" 90*b*, "Rfid" 90*c*, "Location" 90*d*, "Scale" 90*e*, "Inline" 90*f*, and "Video" 90*g*. Hence, a declaration providing a strongly typed definition of an algebraic data type consisting of a plurality of specified types will explicitly specify the ordering that is required for the specified types. Alternately, a Sum can be specified to have a strongly typed definition to include any one of multiple distinct predefined types: for example, the data structure "Item" 90*h* is a Sum that can contain any one of a "Person" data structure (referred to as a "PersonItem") 90*a*, a "Media" data structure (referred to as a "MediaItem") 90*b*, a "Rfid" data structure (referred to as a "RfidItem") 90*c*, an "Inline" data structure (referred to as an "InlineItem") 90*f*, a "Video" data structure (referred to as a "VideoItem") 90*g*, or a "Name" data structure (referred to as a "StringItem") 90*j*.

Another data structure called "MapItem" 90*i* has a strongly typed definition as having the algebraic data type "MapItem" (i.e., a Sum) consisting of the predefined types "Item" 90*h* and "Location" 90*d*, in that order; hence, each MapItem data structure represents a particular item (of type "PersonItem", "MediaItem", "RfidItem", "InlineItem", "VideoItem", or "StringItem") having an identifiable location in the Geospatial application. The algebraic data type (i.e., Sum) "MapItem" 90*i* also is used in the strongly typed definition of the data structure labeled "MapItemEntity" 90*k* that is defined as having the algebraic data type "MapItemEntity" and consisting of, in order, the data structure "Integer", the data structure "MapItem" 90*i*, followed by four lambda functions 92 that return void results (i.e., no results), the four lambda functions are identified as "MoveTo", "Offset", "Rename", and "SetZ".

Similar strongly typed definitions are provided in step 78 for the respective algebraic data types "PersonMiEntity" (also referred to as "person map item entity") 90*m*, "MediaMIEntity" (also referred to as "media map item entity") 90*n*, and "InlineMiEntity" (also referred to as "in-line map item entity" 90*p*, each algebraic data type defined as containing the prescribed types "Integer" 90*q* and "MapItem" 90*i*, plus prescribed lambda functions 92 for manipulation and/or modification of the associated data structures.

In addition to the geospatial application of Table 1, prescribed primitives can be supplied to the transformation system 12 (e.g., in the form of an SML application 14*a* with new features) that provides support for primitive types not defined explicitly in the geospatial application. For example, the following primitive types can be injected into the transformation system 12 to provide support for behaviors of an executable system that has inductive types and monads. Example primitive types that can be injected into the transformation system for support of the geospatial application include "AllEntityHistory*" (a primitive providing an inductive operation over a monad), "AllEntity*" (a primitive providing an inductive operation over a monad), "Entity*" (a primitive providing a monadic operation), "Update*" (a primitive providing a monadic operation), and "Create*" (a primitive providing a monadic operation).

The geospatial application of Table 1 in step 80 provides strongly typed definitions (specified in the portion "GeoSpatial Data Type Constructors") for lambda functions 92 (e.g., "makeLocation", "makePerson" 92*a* of FIG. 8A, "makeMedia", "makeRfid", "makeScale", "makeInline", "makeVideo", "makeMapItem" 92*b* of FIG. 8A) for constructing prescribed data types. Additional strongly typed definitions define lambda functions 92 for constructing data structures that are specific to a type of item (PersonItem, MediaItem, RfidItem, InlineItem, VideoItem, and StringItem). For example, the "makeMapItem" lambda function 92*b* applies the inputs "item" and "loc" (in that order) and returns the data structure "MapItem" (of type "MapItem") 90*i* having the tuples "(item, loc)". The accessor lambda function "item" (listed below the "makeMapItem" lambda function) can obtain the "mapItem" data structure (of type "MapItem") 90*i* as an input and return the "item" data structure from the first part of the tuple ("Fst tpl") from the retrieved (input) "mapItem" data structure 90i; the accessor lambda function "location" can retrieve the "mapItem" data structure as an input and return the "location" data structure from the second part of the tuple ("Snd tpl") from the "mapItem" data structure (of type "MapItem") 90i. Additional strongly typed definitions (e.g., "personName", "email", "phone", "personIpAddr", etc.) define lambda functions for extracting selected values from identified data structures of defined types based on validating that the extracted value satisfies the prescribed typing discipline (e.g., "personName person=case person of Person tpl→(Fst tpl);;"). As described below, these lambda functions can extract the selected data values for various operations in the geospatial application, including creating a new data structure, or initiating a multimedia communications session between selected entities within a geospatial region (two or three-dimensional) selected by a user.

The lambda function "makeEntity" (following the comment "Build Generic Entity Structures") enables the construction of a generic Type in the geospatial application, referred to as "Entity", that is a algebraic data type (e.g., a Sum) that contains the variables "eid" (entity identifier) of type Integer 90q, "mapItem" of type MapItem 90i, and zero or more lambda functions 92 in that order (the lambda functions "firstFn" and "nextFn" also are declared for retrieving lambda functions from a set "a" of lambda functions 92 that are null terminated. As described in further detail below, the variable "eid" is an entity identifier that uniquely identifies a corresponding entity as the entity progresses over time throughout the GeoSpatial system.

A lambda function 92 also can have a strongly typed definition to perform a specified operation based on identifying a data structure as being an instance of a particular type, illustrated by the "itemCase" lambda function: in the case that an item is an instance of type "PersonItem", the lambda function "itemCase" returns a function "pfunc" on an input "a"; in the case that the item is an instance of type "MediaItem", the lambda function "itemCase" returns a function "mfunc" on the input "a", etc.

As described previously, the GeoSpatial application 14 provides a specification that describes functions to be performed; hence, the strongly typed definitions describe the data to be extracted (or the data structure to be created), without specifying the manner in which the data structure(s) are to be fetched or stored from memory (e.g., a non-transitory computer or machine-readable storage medium).

The geospatial application in step 82 also provides strongly typed definitions for creating new data structures that update a state attribute of a MapItem Entity 90k. In particular, a particular attribute of the example embodiment is that no data structure is ever deleted or removed from the geospatial application, nor is any data structure ever overwritten or modified; to the contrary, all data structures are preserved, and each data structure has a corresponding monotonically increasing creation identifier attribute added at the time of its creation (e.g., a temporal attribute such as an epic time value or a time stamp), enabling a complete history of each and every attribute in the geospatial application to be retraced and recreated.

For example, the lambda function "doMoveTo" can create a new instance of an existing MapItem data structure by obtaining the data structures "PosX" (of type "PosX"), "PosY" (of type "PosY"), and "MapItem" (of type "MapItem"), and returning a new data structure "MapItem"; in particular, the data structures "loc", "z", and "it" can be obtained based on applying the respective accessor lambda functions "location" (with input "mapItem"), "position_z" (with input "loc"), and "item" (with input "mapItem") to the existing data structure "mapItem", and a new location can be created using the lambda function "makeLocation" using inputs "x y z" (expressed as "makeLocation x y z"), and returned as variable "ne". Hence, the new data structure "MapItem" of type "MapItem" 90i is created using the lambda function "makeMapItem" (92b of FIG. 8A) using inputs "it" and "ne" (expressed as "makeMapItem it ne"), while maintaining the same entity identifier "eid" that establishes the prior data structure "mapItem" and the new data structure "mapItem" as representing the same entity at a different instance in time.

Hence, the history of a particular entity (e.g., a person, media, RFID, Inline, Video, or Name) can be determined based on obtaining all data structures having the same entity identifier "eid"; similarly, all entities having ever been at or near the same location can be determined by identifying all data structures having the same or similar Location data structures (as expressed by the PosX, PosY, and PosZ types); all entities having used the same Internet Protocol (IP) network address can be determined by identifying all data structures having the same value for "IpAddr" of type "String", etc.

Additional declared lambda functions 92 for creating a new data structure that update a state attribute of a MapItem Entity can include "doOffset" (to change the x y position from an existing "mapItem" data structure), "doSetZ" (to change the z position from an existing "mapItem" data structure), and "doRename" (to rename an existing "mapItem" data structure). For example, the "doRename" lambda function 92 applies the input "new" (of type "Name") to the data structure "mapItem" (of type "MapItem") based on applying the lambda function "itemCase" to select the lambda function to be applied for the corresponding determined type for the data structure "item" 90h (e.g., type "PersonItem", "MediaItem", "RfidItem", "InlineItem", "VideoItem", or "StringItem"): in the case that the data structure "mapItem" is of type "PersonItem", the lambda function "doRename" causes the lambda function "makePersonItem" 92c to apply the input "new" as an input to the "name" variable in the "makePerson" lambda function in "makePersonItem", the remaining variables for the "makePerson" lambda functions retrieved from the existing data structure "mapItem" in the prescribed order by the respective lambda functions "email", "phone", and "personIpAddr" (defined as part of the "makePerson" lambda function); in the case that the data structure "mapItem" is of type "MediaItem", the lambda function "doRename" causes the lambda function "makeMediaItem" to apply the input "new" as an input to the "title" variable in the "makeMedia" lambda function in "makePersonItem", the remaining variables for the "makeMedia" lambda function retrieved from the existing data structure "mapItem" in the prescribed order by the lambda functions "mime" and "url" (defined as part of the "makeMediaStr" lambda function), etc.

The geospatial application also can execute in steps 82 or 84 of FIG. 6 additional declared lambda functions that can include accessor methods for retrieving selected data structures from map item objects and creating new data structures accordingly. For example, the lambda function "getID" can obtain the entity identifier "ntt" as a local variable based on retrieving the first data structure from the first tuple of the "MapItemEntity" data structure 90k, previously declared (under the "Application Types" Declarations) as being of type "Integer" 90q; the lambda function "entity" can be used to fetch the data structure of type "MapItem" 90i from the second element of the "MapItemEntity" data structure 90k (i.e., the first element of the second tuple); the declared lambda functions "moveTo", "offset", "rename", and "setZ" 92 can effectively move, offset, rename, or change the elevation of a specified entity (identified by its entity identifier "eid") based on applying the relevant inputs to the respective lambda functions "doMoveTo" (using inputs "x y"), "doOffset" (using inputs "x y"), "doRename" (using input "new"), and "doSetZ" (using input "z") in the lambda function "UpdateMapItem".

Additional declared lambda functions can create in step 84 new map item entity data structures reflecting an update of a particular entity (identified by its entity identifier), effectively enabling the building of a temporal "MapItem" state machine based on tracking the sequence of map item entity data structures associated with a particular entity identifier. Hence, the geospatial application 14 can search all entities to find all data structures satisfying a selected criterion. For example, the lambda function "entityMapItem" 92g of FIG. 8B creates a new data structure having a new entity identifier "Eid" (of type "integer") if no input is specified, else the lambda function returns the data structure of type "MapItem" and associated with the specified input "eid"; the lambda function "allEntityMapItem" is described as a specification of a function that can create a curried list of any data structure to find all data structures satisfying the supplied input condition (the reference "_" indicates that any input can be accepted, and "\pr" is a lambda function indicating an input of any type is accepted so long as the input can be passed to the lambda function "makeMapItemEntity"); further, the specification of the lambda function "allEntityMapItem" referencing itself enables function to be repeated for the next data structure, until a null condition is encountered.

Hence, applying the example input "PersonItem" would return a data structure in the form of a curried list of all items of type "Person" (and labeled as "PersonItem") in the geospatial application, where a null condition would be encountered upon completion that causes the lambda function "allEntityMapItem" to complete its operations (in accordance with the requirements of being non-Turing complete). Similarly, applying the example input "Item" to the lambda function "allEntityMapItem" would return a data structure in the form of a curried list of all items in the geospatial application. Hence, the lambda function "allEntityMapItem" effectively executes as an infinite loop, except that non-Turing completeness is maintained by completing the operation upon encountering a null condition.

As apparent from the foregoing, the curried lists generated by the associated lambda functions 92 can be stored as data structures for further manipulation, for example adding newly created items to the curried lists, or performing filtering operations on the curried lists. Such manipulation of the curried lists enables optimization of the ad hoc geospatial directory, where any computing device can incrementally (and on an ad hoc basis) add new data structures that create new entities, update existing entities, or create/update curried lists for optimization of queries on the ad hoc geospatial directory.

Similarly, the "allEntityHistoryMapItem" lambda function enables the retrieval of an entity identifier ("eid"), an entity data structure ("entry"), a time stamp ("time"), and another entity ("ntt") until a null condition is encountered, in order to return a history of items into an Entity List that lists the history of all entities.

The declared lambda function can create a maximum or minimum value in an identified entity data structure relative to existing entities. For example the "setZFromTop" lambda function can set a maximum "height" (expressed by its "position_z" value) for an identified entity (identified by its entity identifier "eid" input) by adding a height offset (expressed by the height offset "offZ" input) relative to the maximum height (of type "PosZ") of all other existing data structures of type "MapItem". In particular, the "setZFromTop" lambda function first obtains a list of all map items, and determines the maximum based on concatenating the list of map items.

Additional lambda functions can be used for assigning new reachability for a person, for example "doNewEmail" to create a new map item specifying a new e-mail address for reaching the person, "doNewPhone" to create a new map item specifying a new phone number for reaching the person, "doNewIpAddr" to create a new map item specifying a new IP address for reaching the person, or "changeEmail" to create a new map item specifying an alternative e-mail address (superseding the prior e-mail) for reaching the person, or a lambda function for moving a "person map entity" ("pmeMoveTo"), offsetting a person map entity ("pmeOffset"), renaming a person map entity ("pmeRename"), setting a height ("z") of a person map entity ("pmeSetZ"), changing the e-mail address for a person map entity ("pmeChangeEmail"), changing a phone number for a person map entity ("pmeChangePhone"), or changing the IP address for a person map entity ("pmeChangeIpAddr"). Similar lambda functions can be used for assigning new parameters for different entities such as a media entity (e.g., "doNewURL", "changeUrl", "makeMapItemMediaEntity"), or an in-line entities (e.g., "doNewScale", "changeScale", or "makeMapItemInlineEntity"). As described previously, a data structure is never deleted from the system, hence the history of any entity can be traced throughout the geospatial application based on the corresponding entity identifier and indexed, for example, by the associated timestamp values.

Hence, the example embodiments enable precise tracing of events injected into the geospatial application. For example, if a data packet was injected into the system using a particular source IP address and caused a particular event at a certain time (e.g., a malicious attack or a denial of service attack), the example geospatial application can identify the entities that utilized that IP address, and at what point in time that IP address was utilized.

The portion of the geospatial application labeled "Application Functions" declares a lambda function ("regionFilter") that establishes a rectangular filter within the geospatial region: the inputs include x,y coordinates for a "low" position, x,y coordinates for a "high" position, and x,y coordinates for an offset position, the lambda function "regionFilter" being of a type that includes lambda functions (as evidenced by the term "in").

The foregoing primitive terms, types, tuples, sums, lambdas, and the typing on the lambdas described with respect to Table 1 are used to provide underlying semantic and type support for user interface lambda functions (as apparent from the foregoing, there are no explicit Kind types specified in Table 1: although there are Kind types in the types of the lambda functions in the form of type inference, the Kind types are not referenced explicitly in Table 1). As described in further detail below, the previously-described type and lambda functions are not accessible by users of the geospatial application, but provide underlying semantic, type, and application function execution support for user interface lambda functions that are accessible by users of the geospatial application. The previously-described lambda functions also enable optimization of lambda functions execution in the distributed system, based on creation and storage of curried lists, such as a curried list of all entities in a system, a curried list of a history of all entities of a system, etc. These curried lists can be combined, split, etc., as appropriate, for optimization of queries generated by users of the geospatial application.

The geospatial application in step 86 provides strongly typed definitions for lambda functions 92 to be used for providing a visualization by users in the graphical user interface (presentation layer) 36 of the geospatial application as "Application Interface". These example lambda functions can be called by users in the application layer (presentation layer) 36, implemented for example as a command line interface (CLI) or a graphic user interface (GUI), described below. Example lambda functions include the lambda function "nowhere" that establishes a location having a null position (0, 0, 0) in the (x, y, z) coordinate space, where the zeros are strongly typed as types "PosX", "PosY" and "PosZ". Another lambda function "emptyP" enables construction of an "empty" person data structure (i.e., a person is constructed but nothing is declared), where the type "Name" has a value of "Nobody", and the data types "Email", "Phone" and "IpAddr" have empty values, the lambda function "emptyPI" enables construction of an empty person item based on the input of an empty person ("emptyP"), and the lambda function "emptyPMI" enables construction of an empty person map item that utilizes the "makeMapItem" lambda function applying the inputs "emptyPI" and "nowhere" (default "PosZ" representations also are provided for "inlineZ", "non-InlineZ", and "personZ").

A new user can be created in the geospatial application based on the lambda function "createPersonLoc" 92e using the sequence of inputs of name, e-mail, phone number, IP address, and location. The lambda function "createPerson" can create a person that has a default location; in contrast to lower-level lambda functions permitting creation of a person with no location, at the geospatial application layer each person is assigned a location, at least a default location. Hence, a user of the geospatial application is not permitted to create an item that does not have a location. The lambda function "getPerson" 92f of FIG. 8B enables retrieval of a person data structure 90h by their "eid": if no such person exists yet in the system, in the geospatial application will create a new person map item entity (of type "PersonMiEntity") 90m based on executing the lambda function "makeMapItemPersonEntity" 92i of FIG. 8B. The lambda function "newLoginLoc" 92d enables creation of a person data structure 90a specifying a location by invoking the "createPersonLoc" lambda function 92e, and the lambda function "newLogin" enables creation of a person data structure without any supplied location data (in which case the default location is established using the "createPerson" lambda function). The lambda function "newLoginStr" either creates the person data structure 90a with the supplied strongly typed parameters associated with the user ("n" for Name, "e" for e-mail, "p" for phone number, and "i" for IP address), or retrieves an existing person data structure (identified by the corresponding EID) having the supplied parameters. The lambda functions "login" 92h (FIG. 8B) and "logout" also permit a user to login to the system based on the "getPerson" lambda function, and (optionally) logout by nullifying the entity identifier "eid".

The geospatial application 14 also can provide strongly typed definitions in step 88 of lambda functions available at the presentation layer 36 that can generate a concatenated list of items matching a filter constraint. For example, the lambda function "isPersonWith" enables the geospatial application 14 to determine if there is a person associated with a particular entity, enabling identification of one or more persons associated with a particular IP address (as implemented by the lambda function "getPersonByIp").

Figure 8A:
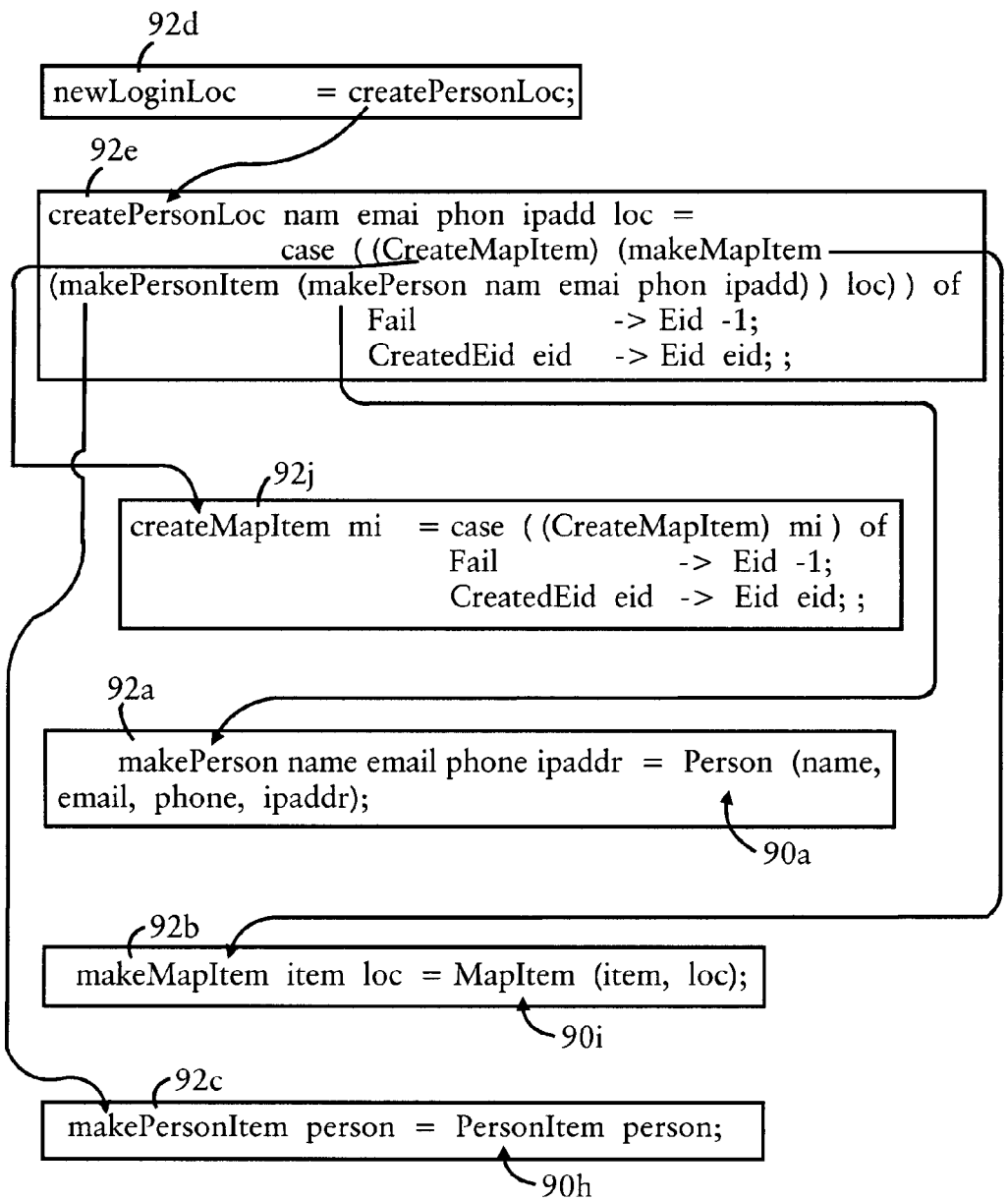
FIGS. 8A and 8B illustrate example strongly typed definitions in a geospatial application for creating a new data structure of a prescribed type, and for executing a prescribed lambda function according to a prescribed type, according to an example embodiment.
Figure 8B:
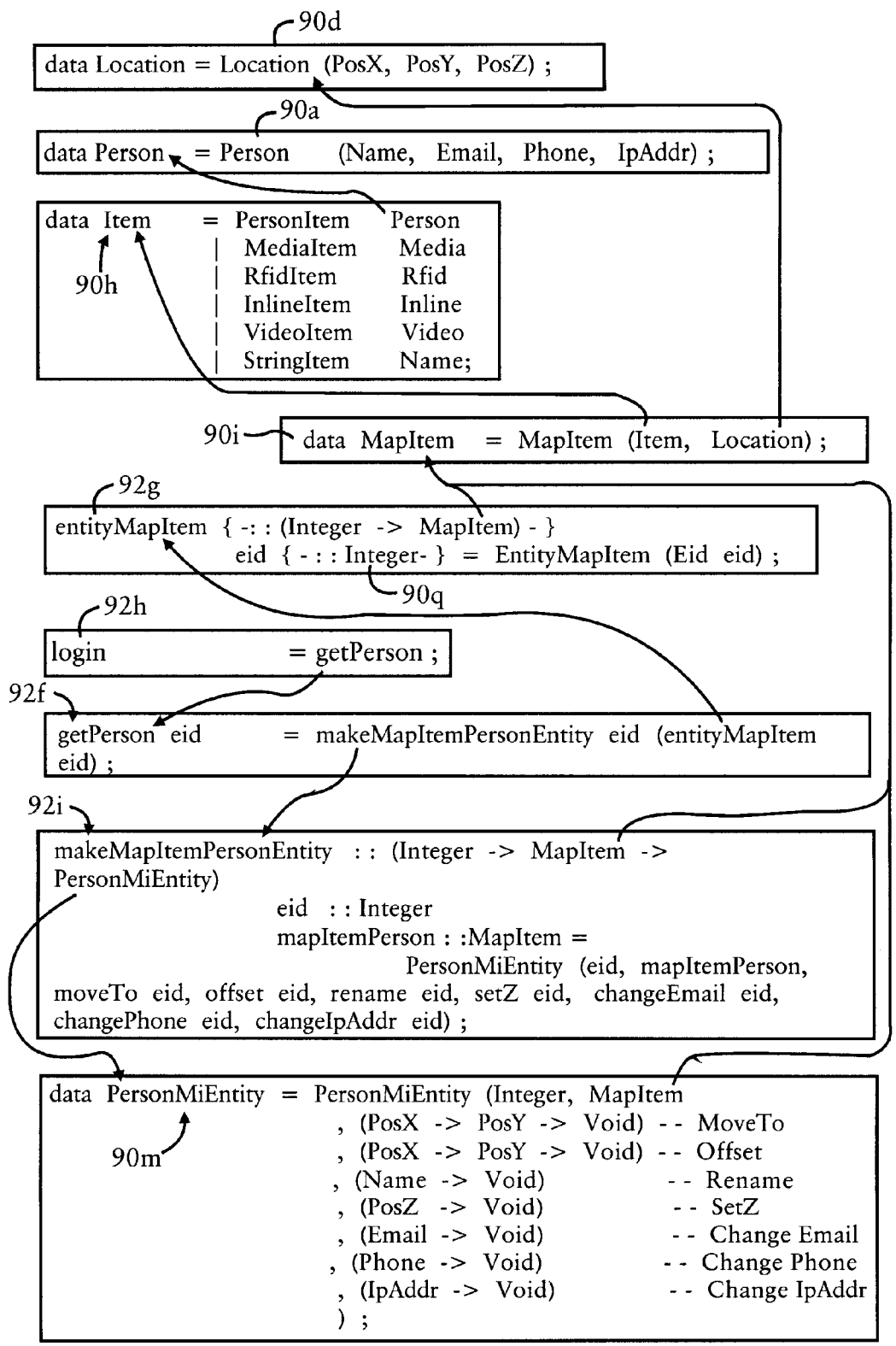

The lambda function "createMapItem" 92j of FIG. 8A enables creation in step 88 of an item and returns the entity identifier to a client application executing the presentation layer, else a "−1" in the case of a fault during creation. The lambda function "getMapItem" enables in step 88 retrieval of a list of all data structures having the specified entity identifier ("eid"), terminated by a null. Hence, any entity can be recalled by its entity identifier "eid". Similar lambda functions in step 88 are specified for creating and accessing media entities, RFID entities, in-line media entities, video entities (for injecting a video camera), and string entities, including associating different entities together (for example, the lambda function "createVideoStr" enables injection of a video stream, and "getVideo" enables retrieval of the video stream by retrieval of the Map item).

The lambda function "getWithFilter" enables creation by the geospatial application in step 88 of a concatenated list of items that satisfy a filter requirement of a list of identifiers (a concatenated list is generated using the command "catalist"; any data structure can be concatenated using the prefix "cata"). The lambda function "getAndZipWithFilter" enables creation by the geospatial application in step 88 of a concatenated list of items that is "zipped" with (i.e. wrapped by) arguments used to obtain the items, similar to a "map fold" operation. For example, assume one wishes to move a list of items (e.g., people) to a new z axis, the function "getAndZipWithFilter" can form a curry of left/right pairs of people with moved z axis values. The lambda function "applyOpToNttList" enables the geospatial application to apply an operator to an existing entity list. The lambda function "hysteresis" can be used with location operations to indicate that if new values for x-y coordinates ("new_x new_y") are within a prescribed distance ("histX", "histY") of an existing value ("old_x old_y"), then the entity is deemed to be at the same location. The lambda function "moveIfNewLoc" enables the geospatial application to move an entity (by creating a new entity data structure) if the new location exceeds the hysteresis limit as specified in the lambda function "moveIfNewLoc". Hence, the lambda function "UpdatePersonAndRfId" enables the geospatial application to generate an updated list of updated RFID tags (by MAC address) and an updated list of Persons by IP address.

Hence, the above-described user interface lambda functions can be invoked by users in the presentation layer (36 of FIG. 1) of the geospatial application. The above-described lambda functions can be invoked based on the users submitting a request for execution of at least one lambda function in an operation of the geospatial application. Further, these application interface functions can be implemented as a command line interface (CLI), Application Programming Interfaces (APIs), or more commonly as a graphic user interface (GUI) to facilitate a executing one or more user functions based on the user submitting a graphic icon-based request that is mapped by the GUI to an explicit lambda function request or a prescribed reference that invokes one or more of the lambda functions.

IV. EXAMPLE HARDWARE OVERVIEW

Figure 9:
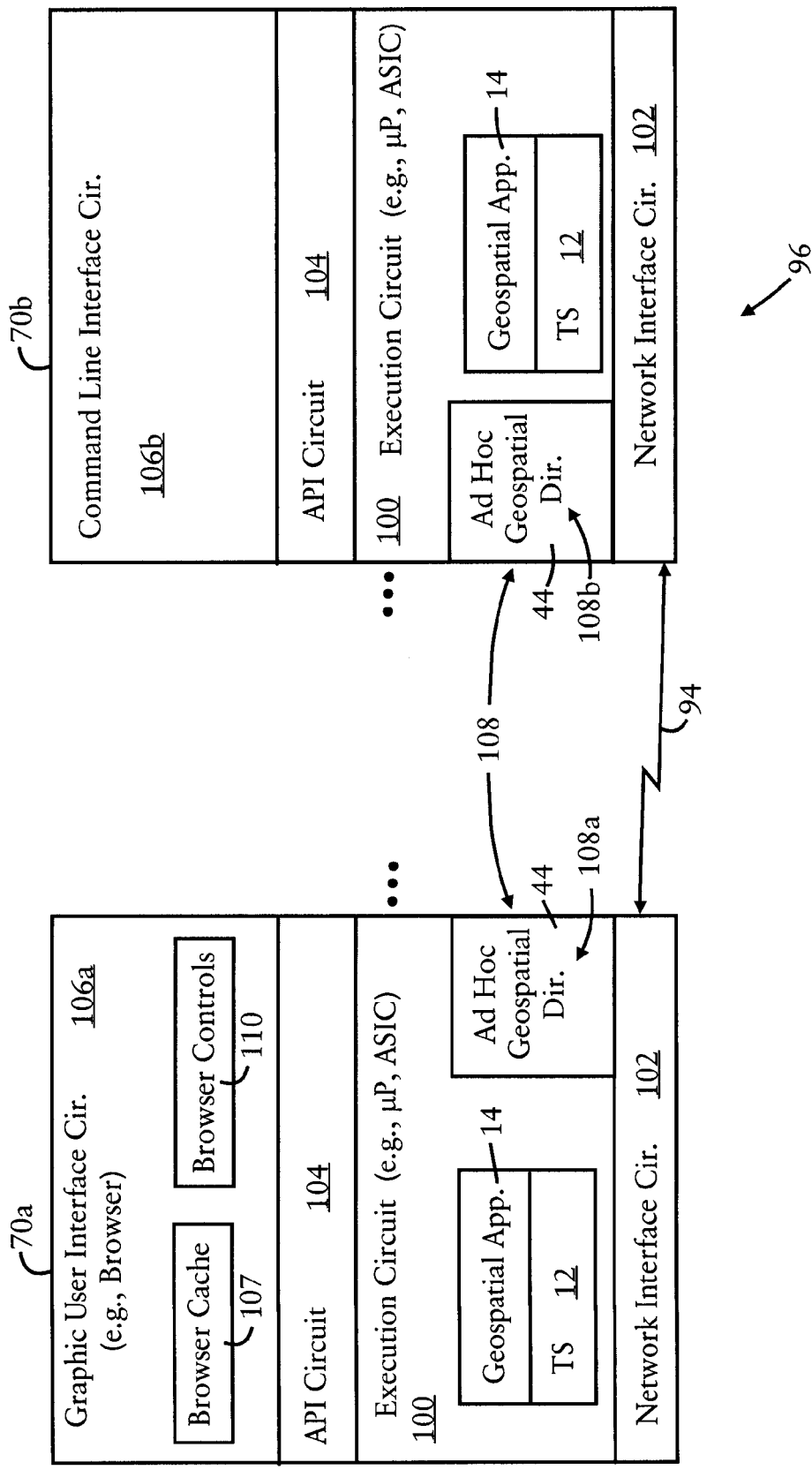
FIG. 9 illustrates another example of computing nodes executing a geospatial application, according to an example embodiment.

FIG. 9 illustrates example computing devices 70 (e.g., 70a, 70b) of FIG. 3 including hardware for execution of the geospatial application 14 and the transformation system 12 of FIG. 1, according to an example embodiment. Each computing node 70 is implemented as a physical machine (i.e., a hardware device). Each of the computing devices 70 can include a non-transitory tangible computer readable storage medium 44, an execution circuit 100, an interface circuit such as a network interface circuit 102 and/or an application programming interface (API) circuit 104, and a user interface circuit 106 such as a graphic user interface (GUI) circuit 106a and/or a command line interface (CLI) circuit 106b. The network interface circuit 102 can be configured for establishing a wired or wireless communication link (e.g., IEEE 802.3, IEEE 802.11, Bluetooth, Universal Serial Bus, etc.) 94 with another network interface circuit 102, for example via a physical communication network (e.g., an Internet Protocol over wired or wireless Ethernet network).

The graphic user interface circuit 106a can include a browser cache 107 (implemented as part of or distinct from the storage medium 44) configured for caching of previously loaded images, user information (e.g., cookies), etc. The graphic user interface circuit 106a also can include browser controls 110, for example non-transitory executable logic configured for translating controls and commands (received via the API circuit 104 from the execution circuit 100) into context-sensitive graphical commands that are available to a user via a browser interface (e.g., a pointing device such as a mouse, touch sensitive screen, etc.). The command line interface circuit 106b can be configured for submitting commands and/or data input by a user via a keyboard (not shown), and displaying results received from the execution circuit 100 via the API circuit 104.

Any of the disclosed circuits of the computing nodes 70, including the execution circuit 100, the network interface circuit 102, the API circuit 104, the user interface circuit 106a or 106b, or the compiler circuit 38 within the transformation system 12, can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (μP) and implemented using one or more integrated circuits, where execution of executable code stored in a memory circuit of a computing node 70 causes the integrated circuit(s) implementing the processor circuit in the computing node 70 to store application state variables in processor memory, creating an executable application resource (e.g., an application instance) that performs the operations of the circuit as described herein. Hence, use of the term "circuit" in this specification refers to both a hardware-based circuit that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit can be implemented, for example, using one or more integrated circuits implemented in the form of a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit can be implemented dynamically by the processor circuit in the computing node 70, for example based on memory address assignment and partitioning executed by the internal processor circuit.

Further, the steps described herein (e.g., with respect any of the FIGS. 1-17) can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the steps described herein also can be implemented as non-transitory executable logic that is encoded in one or more non-transitory tangible media for execution (e.g., programmable logic arrays or devices, field programmable gate arrays, programmable array logic, application specific integrated circuits, etc.).

V. OPTIMIZATION OF GEOSPATIAL APPLICATION FOR AD HOC GEOSPATIAL DIRECTORY

Figure 10:
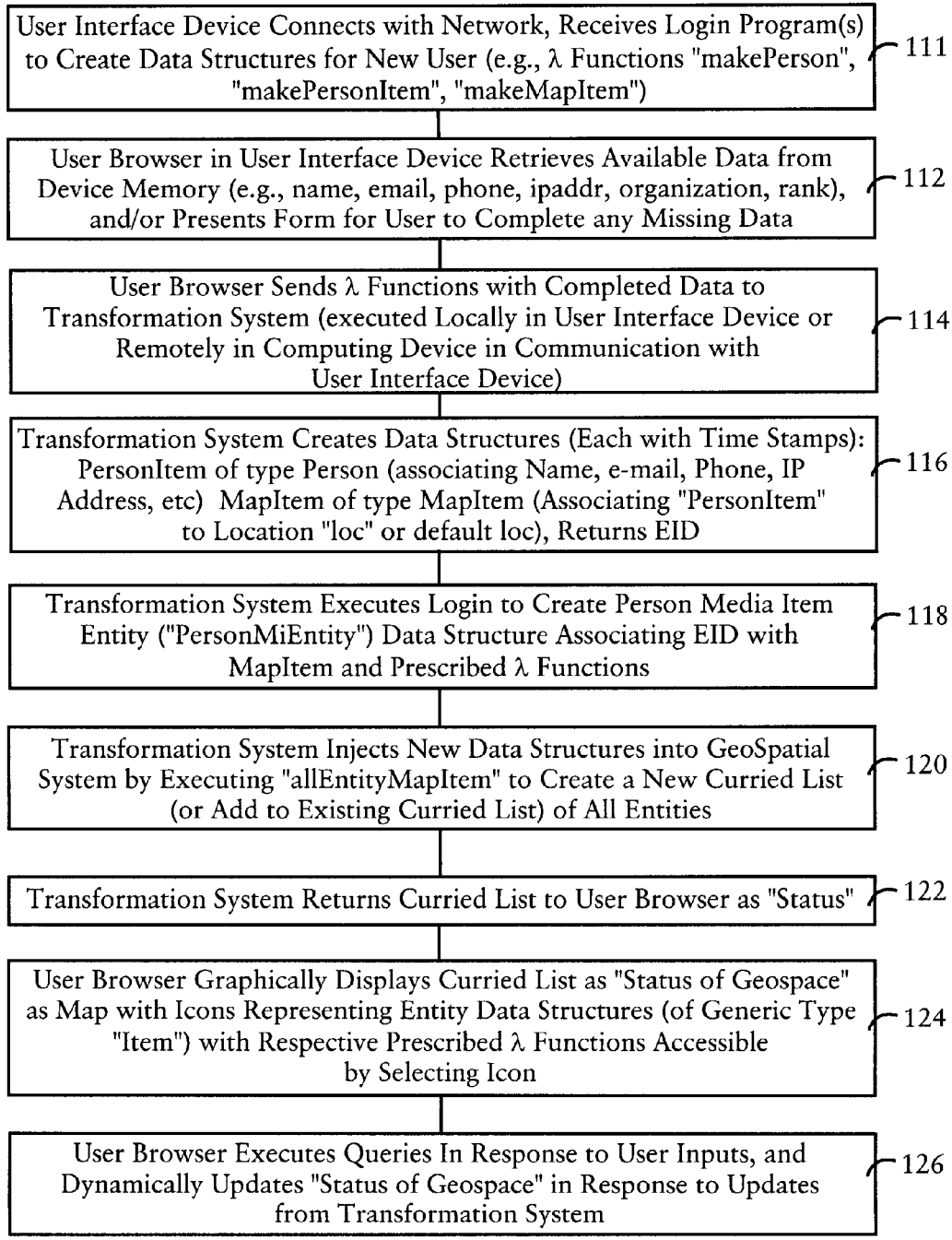
FIG. 10 illustrates an example method by ad hoc devices in generating and operating on an ad hoc geospatial directory of a geospatial application, according to an example embodiment.

FIG. 10 illustrates an example method by computing devices 70 (e.g., 70a, 70b of FIG. 9) executing lambda functions in generating and operating on one or more entities of an ad hoc geospatial directory 108 of a geospatial application 14, according to an example embodiment. Each computing device (e.g., laptop, cellphone, smart phone, personal digital assistant, etc.) 70 that executes at least a user interface component (presentation layer) 106 of the geospatial application also has the potential to execute another component of the geospatial application underlying the user interface component, namely execution of operations associated with the geospatial application 14.

The geospatial application 14 and the transformation system 12 of FIG. 1 can be implemented based on execution in hardware by the execution circuit 100 of any one or more of the computing devices 70. In particular, the geospatial application 14 and transformation system 12 can be initially executed solely by the execution circuit 100 of a first computing device (e.g., 70b) that establishes the initial ad hoc geospatial directory 108b based on executing the login of the first user, namely the user of the first computing device 70b.

Assume in step 111 of FIG. 10 that the network interface circuit 102 of a second computing device (e.g., user interface device 70a) establishes a wired or wireless communications link 94 with the network interface circuit 102 of the first computing device: in response to detecting the communications link 94, the execution circuit 100 in the computing device 70b executing the geospatial application can transmit at least a portion of the geospatial application 14 (e.g., login) and at least a portion of the transformation system 12 to the second computing device (e.g., 70a). The execution circuit 100 of the computing device 70b can be configured for selectively providing a substantial portion of the geospatial application 14 and the transformation system 12 based on the determined capabilities of the recently detected computing device 70. For example, if the execution circuit 100 of the computing device 70b determines the recently detected computing device 70 is a tiny client incapable of performing distributed computing of the geospatial application 14 (e.g., a user device having limited processing capabilities and limited web browsing capabilities), the execution circuit 100 can limit transmission to basic user interface lambda functions such as the login lambda function 92h of FIG. 8B; if, however, the execution circuit 100 of the computing device 70b determines the recently detected computing device is a client device 70a capable of performing distributed computing of the geospatial application 14, the execution circuit 100 of the computing device 70b can transmit the transformation system 12 (if not already installed) and a substantial portion of the geospatial application 14 (if not already installed) to the computing device 70a for distributed computing thereof. The execution circuit 100 of the second computing device (e.g., 70a) also can incrementally receive additional components of the geospatial application 14 and/or data structures of the ad hoc geospatial directory 108 (e.g., 108b). Hence, the geospatial application 14 (and transformation system 14) can be propagated to each computing device 70 as it joins the network 96 of computing devices 70.

Hence, the geospatial application 14 can be supplied to different computing devices 70 as they join the network 96, enabling ad hoc distributed execution of the geospatial application 14. As described in further detail below, the ad hoc distributed execution of the geospatial application 14 also enables the establishment of the ad hoc geospatial directory 108 based on the coordinated integration of the respective copies (e.g., 108a, 108b) using distributed queries, data fusion, and feature injection, described below.

In response to the computing device 70a receiving in step 111 at least a portion of the geospatial application 14 and transformation system 12 from the first computing device (e.g., 70b) via its network interface circuit 102, the execution circuit 100 of the second computing device (e.g., 70a) can initiate execution of the geospatial application 14. For example, the user interface device 70a can receive the transformation system 12 and selected program fragments to enabling creation of new data structures for a new entity (e.g., a new person item entity), such as the lambda functions "makePerson" 92a, "makeMapItem" 92b, "makePersonItem" 92c, "newLoginLoc" 92d, "createPersonLoc" 92e, etc.

The user browser 106a executed in the computing device 70a can execute one or more of the supplied lambda functions 92 in step 112 based on retrieving the available data (e.g., user name, user e-mail, user phone number, user IP address, name of user's organization (e.g., fire department, police department, medical response team, etc.) and rank) from device memory or the browser cache 107, and/or presenting a graphical form for the user to complete any missing data using the browser controls 110. The user browser 106 also can access the user cache 107 to determine if the user cache 107 stores an entity identifier: if the user interface determines an entity identifier is stored in the user cache, the user interface uses that entity identifier to execute the login.

In response to the user posting the inputs using the browser controls 110 (or automatic posting by the browser automatically completing the requested fields), the user browser circuit 106a can send the posted lambda function(s) 92 with the completed data, for example in the form of a request for execution of at least the one lambda function, to the execution circuit 100 in step 114. If the computing device 70 executing the user browser 106 is locally executing the geospatial application 14, the posted lambda functions 92 are received by the execution circuit 100 via the API circuit 104. If the user device executing the user browser 106 is a tiny client that is not executing the geospatial application 14, the corresponding network interface circuit 102 can forward the request for execution of the one or more lambda functions to a computing device 70 executing the geospatial application (e.g., 70b), where the execution circuit 100 of the computing device 70b receives the request for execution via the network interface circuit 102.

Hence, the execution circuit 100 (executed locally or remotely) receives the user post from the graphic user interface 106a as a request for execution of at least one lambda function in an operation of the geospatial application 14, for example creation of the data structures associated with logging in a new person (e.g., type Person 90a, type PersonItem 90h, type MapItem 90i, and PersonMiEntity 90m of FIG. 7). The execution circuit 100 executes the relevant lambda functions 92 of the geospatial application 14, for logging in the user as requested, for example optimizing execution of the relevant lambda functions 92 based on creating in step 116 the relevant data structures (e.g., 90a, 90h, and 90i) for a new user, storing the newly created data structures in the local ad hoc geospatial directory 108a, and returning a response to the request that specifies an entity identifier (EID) for the new user; the execution circuit 100 executes in step 118 the login lambda function 92h using the EID of the new user for creation and storage in the local ad hoc geospatial directory 108a of the data structure "PersonMiEntity" 90m. As described previously, the data structure "PersonMiEntity" 90m is stored in the local ad hoc geospatial directory 108a and includes the EID of type "Integer" 90q, the data structure MapItem of type "MapItem" 90i (containing the "PersonItem" data structure of type "Person" 90a and the Location of type "Location" 90d), and selected lambda functions 92 for selective modification of the corresponding MapItem data structure 90i. As described previously, each data structure inherently has a monotonically increasing creation identifier (e.g., a temporal attribute such as a time stamp): the monotonically increasing creation identifier enables the tracking the tracking of any attribute of any entity over time (e.g., all use of a given IP address over time, all use of a given phone number at a given time, all entities having been near a given location ("Loc") over time, tracking the location of any entity (person, video camera, RFID tag) over time, etc.).

The execution circuit 100 executing the transformation system 12 can optimize execution of the ad hoc geospatial directory based on injecting the new data structures associated with a new user into the geospatial system by executing a query (e.g., "allEntityMapItem") to create a new curried list representing a concatenated list of all the entities in the ad hoc geospatial directory 108, or add to an existing curried list, of all entities identified collectively within the ad hoc geospatial directory 108. For example, the transformation system 12 executed in the computing device 70a can execute the lambda function "allEntityMapItem" on the local ad hoc geospatial directory 108a, and/or can forward to the transformation system 12 executed in the computing device 70b the lambda function "allEntityMapItem" as a request to create a new curried list of all entities; in response to the computing device 70a receiving a response to the request in the form of the curried list from the transformation system 12 executed in the computing device 70b, the transformation system 12 executed in the computing device 70a can update the curried list with the new user entity in step 120 (and any other locally stored entities in the local ad hoc geospatial directory 108), store the updated curried list in the local directory 108*a*, and return in step 122 the updated curried list to the user browser 106*a* as a "Status" of the ad hoc geospatial directory 108 within the geospatial application 14. The updated curried list is sent in the form of a data structure including the curried list of all the entities in the geospatial directory, the data structure including (e.g., as part of the curried list or distinct from the curried list) one or more lambda functions for generating a query, modifying a state of one of the entities, or accessing one of the entities (e.g., initiating a communication session).

Figure 11:
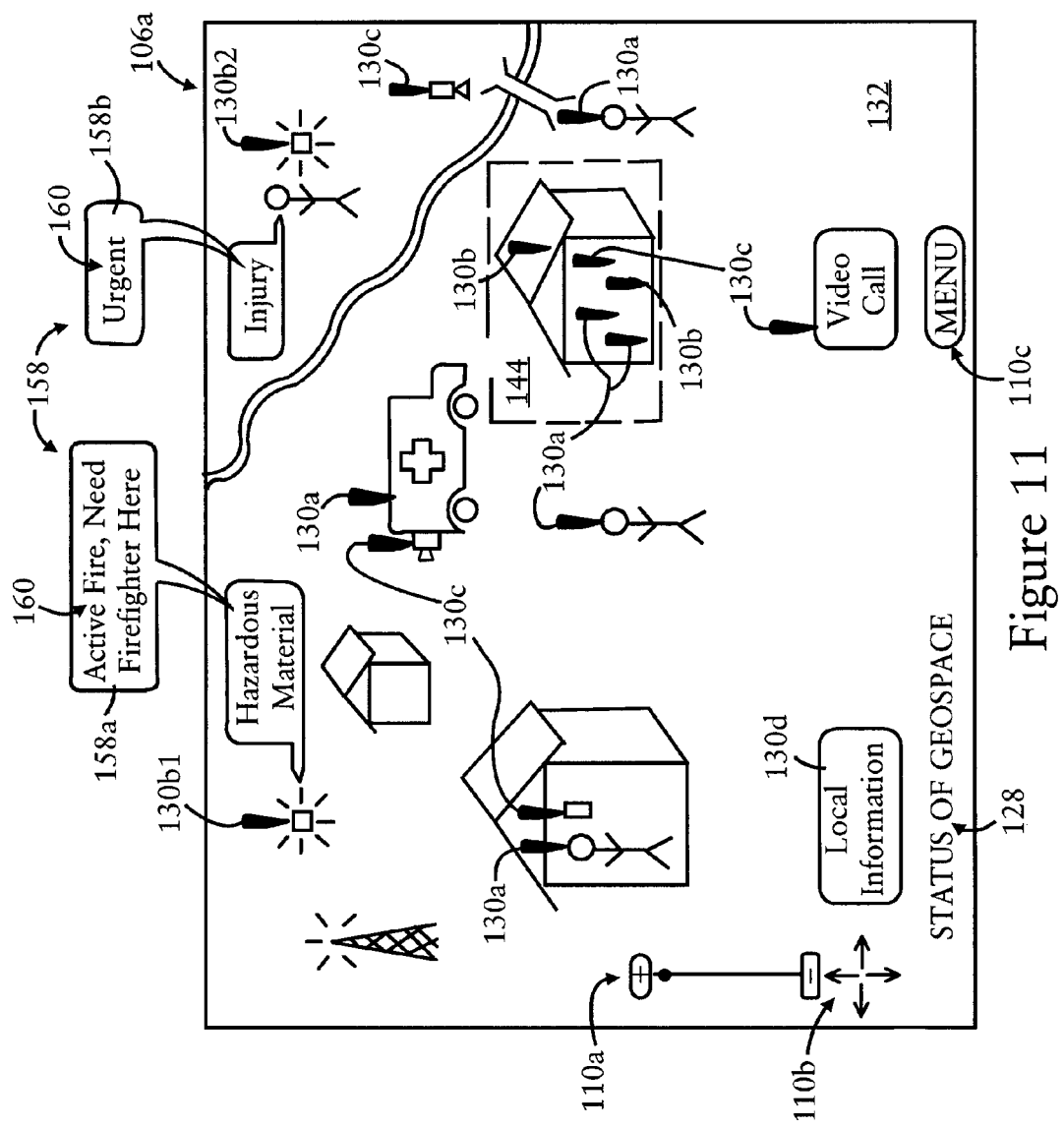
FIG. 11 illustrates an example graphical display of entities of an ad hoc geospatial directory in a geospatial map, according to an example embodiment.

As illustrated in FIG. 11, the user browser 106*a* executed in the computing device 70*a* can graphically display in step 124 the curried list of all the entities in the geospatial directory as a "Status of Geospace" 128, where the entities in the curried list are displayed as icons 130 in a geospatial map 132, for example as a person entity icon 130*a* (associated with a PersonItem), an RFID tag icon 130*b* (associated with an RfidItem), a video tag icon 130*c* (associated with a VideoItem for a video camera), a media tag icon 130*d* (associated with a MediaItem), etc. Hence, a data structure (map item entity) can be displayed in the browser 106*a*, including all the lambda functions, where the data structure received by the user interface includes executable code (in the form of lambda functions) that can be executed by the user interface in the browser 106*a*, each of the elements of the map item entity (including the lambda functions) being strongly typed. Hence, the browser can recognize the different types, for example one data structure is of type "person item", and another data structure is of type "location", hence the "location" data structure can be rendered by the browser as a location on the map, and the "person item" data structure can be rendered as an icon at the corresponding location on the map, where the lambda functions of a data structure are accessible based on selecting the map icon associated with the data structure.

As described previously, each icon 130 is associated with a corresponding entity represented by a corresponding data structure having one or more lambda functions 92 that enable the user, via the geospatial map 132, to generate a query of the ad hoc geospatial directory 108 (for example, based on using the position controls 110*b* or zoom 110*a* to require additional population of entities based on moving or resizing the map 132), modify a state of at least one of the entities (e.g., moved to a different location, offset, rename, set height (i.e., "set Z"), change e-mail address, change phone number, change IP address, etc.), or access one of the entities (e.g., initiating an IP phone call, a video call, a messaging session, etc.).

Hence, a user can view the geospatial application in a browser in the form of a map 132, where each of the lambda functions available to the user can be defined as buttons, menu items, drop-down lists, etc., and the data associated with a command (e.g., "makeRfid") can be displayed in a form on the screen, where the actual textual command with input parameters can be supplied by the browser to the execution engine residing in the computing node 70. If a user selects (e.g., "clicks on") an icon 130 representing a map item entity, the selecting of an icon 130 can invoke a pop-up list for available actions to be performed on that particular map item entity, where the action to be performed is executing a particular lambda function that is available to the user: inside that map item entity will be a list of available lambda functions (e.g., changing a name, changing a z-axis value, changing an e-mail, changing a phone, changing the IP address), which can be presented as menu items for selection by the user. If the user selects one of the lambda functions, a general purpose visualizer for the selected lambda function can open a display window enabling the user to enter the necessary input parameters (e.g., new X location, new Y location, new e-mail address, new phone number, new IP address, etc.). In addition, the general purpose visualizer can open with the appropriate window according to the type to be input, for example one input window for input of an object of type string, another input window for input of an object of type integer, etc.

As described in further detail below in Section VI with respect to FIGS. 12-17, the pop-up list for available actions to be performed on a particular map item entity (invoked in response to the user selecting the corresponding icon 130) also can include one or more lambda functions that enable the user to associate the particular map item entity with an identifiable workflow item of a prescribed workflow. Hence, the map item entity presented to the user can include a lambda function that enables the user to request execution of the identifiable workflow item on the corresponding map item entity, in order to assign a prescribed workflow in the geospatial application to the particular map item entity. The execution circuit 100 can optimize execution of the lambda function based on generating a work entity data structure that associates the workflow item with the map item entity, and generating additional data structures such as a work item entity, curried lists, etc., for optimized execution of the workflow on the particular map item entity. Further, the user can be supplied with additional data structures having lambda functions that enable the user to change the workflow state of the particular map item entity, and/or modify the workflow states within the prescribed workflow. As described previously, any change by a user can be implemented instantaneously throughout the geospatial application by the execution circuit 100, including any modification to the workflow states by the user, enabling the change to be implemented for any other map item entities interacting with the workflow.

In response to the user executing another command via the browser controls 110, the user browser sends in step 126 the queries in response to the user inputs, and dynamically updates the "Status of Geospace" in response to the updates executed by the transformation system 12 in step 126. As described previously, no data structure is ever deleted. Further, each entity data structure includes a monotonically increasing creation identifier identifying a creation time relative to other entities (e.g., a time stamp). Hence, the state of a map item entity is updated based on the transformation system 12 obtaining the entity identifier (EID) associated with entity to be modified from associated data structure (e.g., 90*k*, 90*m*, 90*n*, 90*p*): typically the user browser 106 can supply the data structure (e.g., 90*k*, 90*m*, 90*n*, 90*p*), the identification of the lambda function 92 to be invoked, and the relevant input parameters. The transformation system 12 in response can create a new entity data structure having the entity identifier, a unique time stamp, and at least one non-temporal attribute distinct from the original data structure (e.g., the new input parameter) and distinct from the monotonically increasing creation identifier. Hence, the original entity data structure and the new entity data structure represent a corresponding state change in associated entity.

As apparent from the foregoing, local execution of the SML-based geospatial application 14 by the execution circuit 100 of a computing device 70 enables the execution circuit 100 to execute only those functions that are necessary for completion, i.e., a necessary functions can be deferred until required. Moreover, since the geospatial application is based on the SML language that is non-Turing complete, the execution circuit 100 either will execute a lambda function to completion, or return a "void" (null) result. Hence, a computing device 70 can continue to provide geospatial application operations for the ad hoc geospatial directory 108, even if the computing device 70 becomes disconnected from the remainder of the network 96, since any inaccessible data structures will simply return a "void" (null) result.

Further, the transformation system 12 executed in each computing device is configured for optimizing execution of each lambda function prior to execution thereof based on recompiling the geospatial application 14 as described previously in Section I. Hence, the interface circuit 102 can receive one or more requests for execution of at least one lambda function 92 in an operation of the geospatial application 14 for operating on one or more entities of the ad hoc geospatial directory 108 as accessible by the computing device 70. For example, the API circuit 104 can receive local requests from the local user interface 106, and the network interface circuit 102 can receive remote requests from a user browser of a tiny client device and/or a second computing device executing a query.

The execution circuit 100 executing the transformation system 12 can optimize the operations to be executed on the ad hoc geospatial directory 108, for example based on joining the multiple requests (for execution of respective operations) into a single local request (or a reduced number of local requests), and optionally one or more remote requests. For example, the transformation system 12 may receive multiple queries related to entities within overlapping regions of the geospace: the transformation system 12 can join the multiple queries into a single locally-executable request related to an area that is the union of all the overlapping areas; the transformation system 12 also can generate from the multiple queries a remote request, distinct from the locally executable request, for remote execution of a portion of the requests related to remote entities that are not within the local ad hoc geospatial directory 108a.

The transformation system 12 can send the remotely executable request to a second computing device (e.g., 70b) for execution of the remotely executable request: the remotely-executable request can optionally include a request for a remotely-stored data structure associated with one of the entities of the ad hoc geospatial directory 108, or the request also can supply a locally-stored data structure from the ad hoc geospatial directory 108a. If the second computing device receiving the request is unable to complete the request, it can either forward the request to another device, or return a void (null) result. The transformation system 12 as executed by the execution circuit 100 can optimize and execute the local requests, and supply any new data structures to remote computing nodes as needed (e.g., in response to an update query, etc.).

Assuming the transformation system 12 receives remote results from one or more remote computing nodes 70 (e.g., the remote results responsive to the previously-sent remotely executable request), the transformation system 12 can compile the remote results with the local results, as needed, to generate compiled results. The transformation system 12 also can selectively partition the compiled results (or the local result and remote result in uncompiled form) to generate the appropriate responses to the received requests, and return the responses to the requesting user interfaces 106.

As described previously, no data structures are ever deleted from the geospatial application, hence activities of any entity or list of entities can be traced over time based on any defined attribute, for example all entities that have been within a prescribed location, all entities having utilized a prescribed IP address, phone number, etc. Further, individual persons can be tracked based on any one of the defined attributes. Hence, queries such as "allNTT" can be generated for selective retrieval of entities associated with any defined attribute.

As noted from the foregoing description of the geospatial application in Table 1, the geospatial application written according to the symbol manipulation language is expressed as a specification describing the operations to be performed; hence, the implementation and execution of the geospatial application by the transformation system 12 is transparent to the actual specification of the geospatial application 14 according to the prescribed symbol manipulation language as illustrated in Table 1.

Operations such as filtering and finding items within a bounded area 144 of FIG. 11 (e.g., using the "regionFilter" lambda function) can be executed based on the transformation system 12 building a list of all entities (e.g., map item entities using the "allEntityMapItem" lambda function): the list of all entities can be generated by one or more computing devices 70 within the distributed system 96, and sent to any device requiring the list; similarly, a computing device 70 receiving the list can update the list and return the updated list back into the distributed system (e.g., by broadcasting to other computing devices or based on a prescribed data replication and distribution protocol), resulting in continuous updating of the list of all entities by different computing devices within the distributed system.

A computing device 70 executing at least a portion of the geospatial application 14 also can extract, from an existing list of entities stored in the ad hoc geospatial directory 108a, a second list of entities that are within a bounded area specified according to a prescribed filtering function (e.g., "getWithFilter", "regionFilter", etc.).

The testing section in Table 1 illustrates examples of calling the previously-described user interface lambda functions in Table 1. Hence, the testing portion illustrates example commands that could be entered into a command line interface (CLI) 106b or a GUI 106a.

More advanced operations can include selecting multiple map item entities on the map 132 in order to simultaneously operate on all selected entities; example operations include simultaneously moving all the selected entities, or simultaneously setting up shared communication session such as a shared multimedia, audio, video, instant messaging, and/or conference telephone communication session between all the selected entities based on invoking one or more accessor lambda functions for accessing the entities via respective access protocols.

As described below in Section VI, the use of strongly-typed definitions enables new features to be added dynamically to the geospatial application 14 while maintaining stability. For example, if a new type was to be added to the type "Person" 90a (e.g., a pager number or a new lambda function for requesting execution of an identified workflow item on the corresponding geospatial entity), the new type can be added, and the transformation system can recompile the geospatial application 14, enabling the added property (e.g., pager number or new lambda function) to be automatically added to the user interface as a new type, without the necessity of manually modifying the code in the geospatial application.

VI. AD HOC ASSOCIATION OF WORKFLOW ITEMS TO GEOSPATIAL ENTITIES

Figure 12:
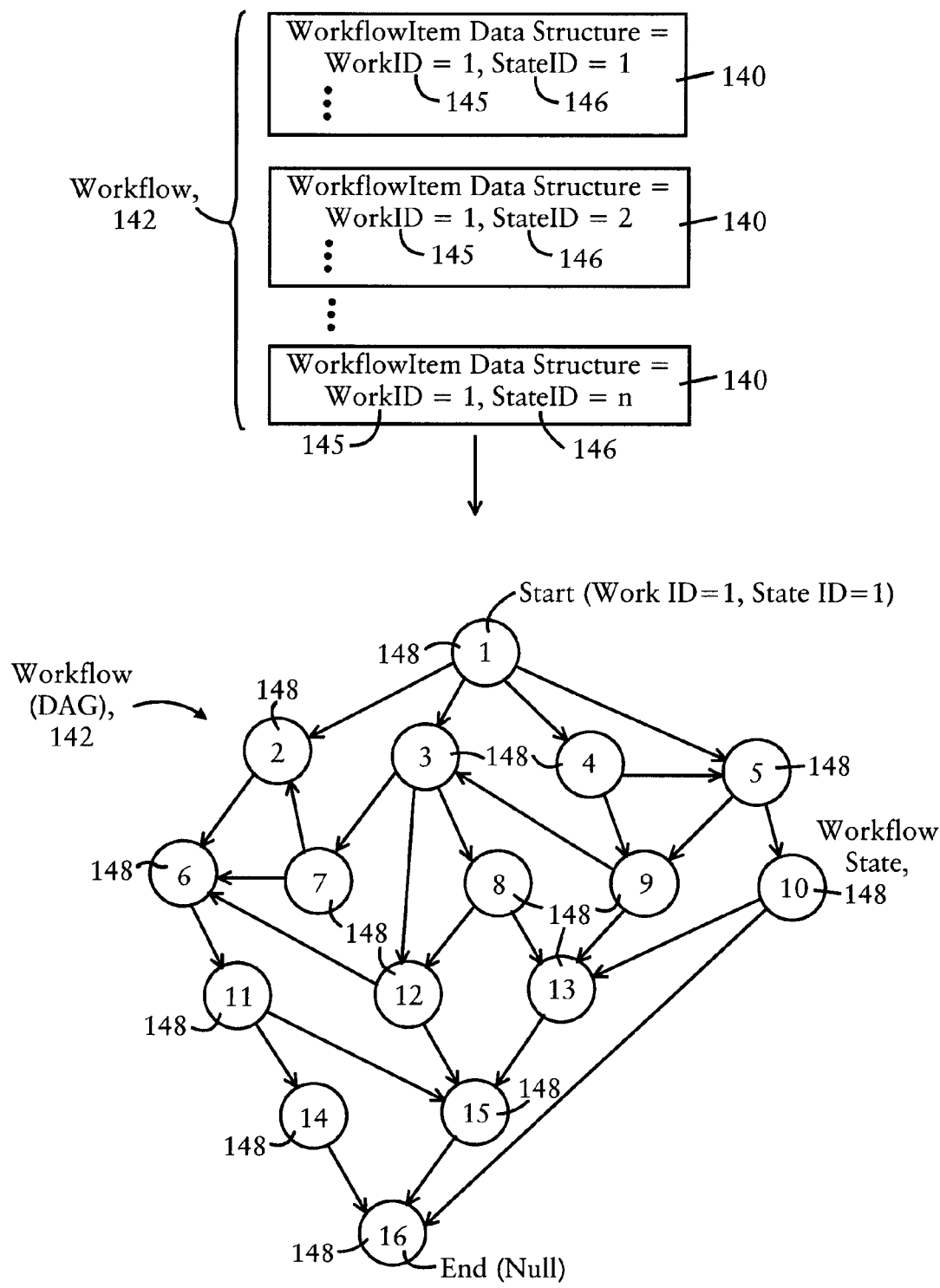
FIG. 12 illustrates example workflow item data structures that establish a prescribed workflow for operating on entities in the geospatial application by one of the computing nodes of FIG. 3 or FIG. 9, according to an example embodiment.

FIG. 12 illustrates example workflow item data structures 140 that are used by the execution circuit 100 of FIG. 9 to establish a prescribed workflow 142 for operating on entities (illustrated by respective icons 130 in the map 132 of FIG. 11) in the ad hoc geospatial directory 108, according to an example embodiment. The data structures and lambda functions illustrated and described in this Section VI. with respect to FIGS. 12-17 are illustrated in a simplified form without explicitly specifying the specific SML-based semantic and type definitions as described previously with respect to Table 1; it should be apparent, however, how to explicitly define the necessary strongly typed definitions for each of the data structures and lambda functions described herein based on the foregoing description.

Figure 14:
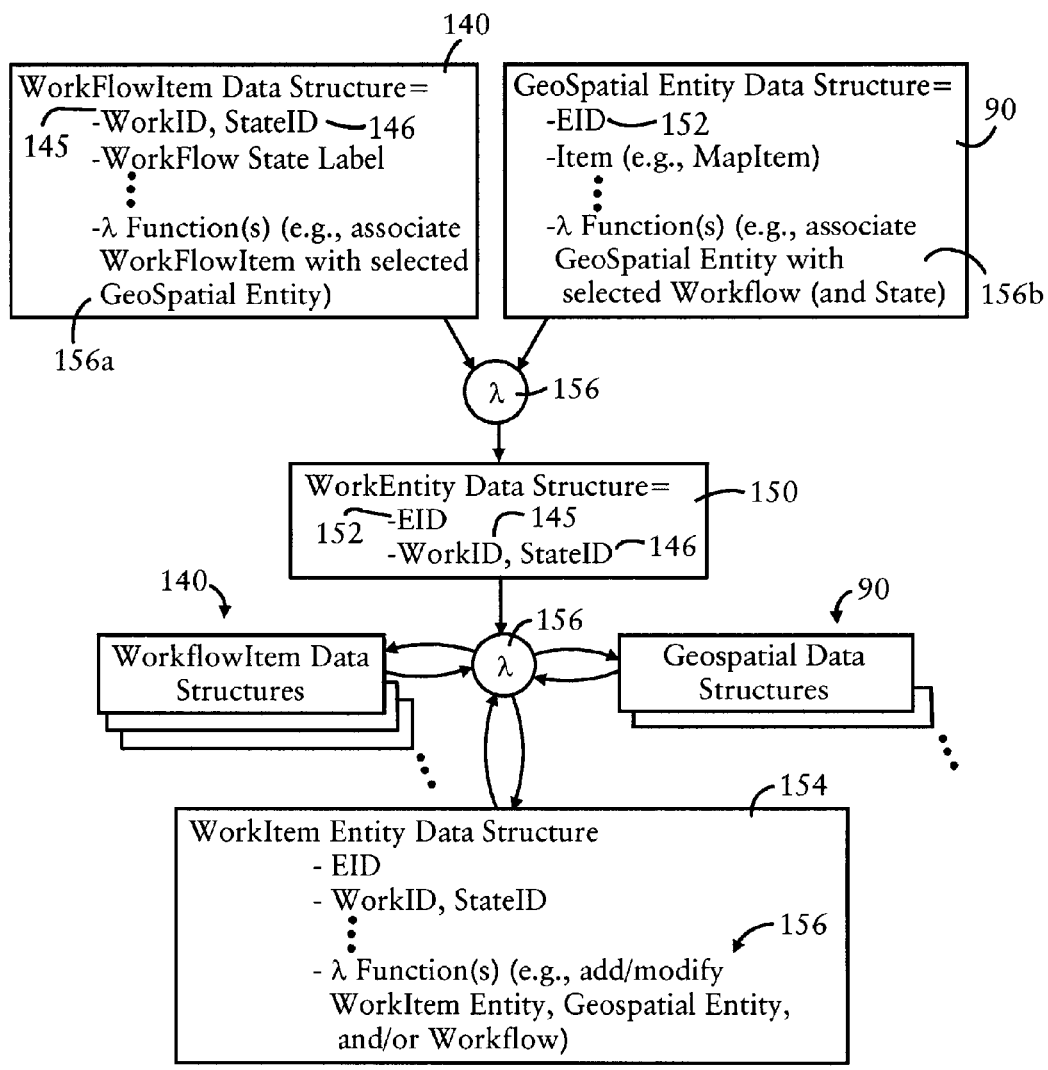
FIG. 14 illustrates generation of an example work entity data structure that associates a workflow item with one of the entities of the ad hoc geospatial directory, and a work item entity data structure associated with the work entity for ad hoc modification of the workflow state of the corresponding entity, according to an example embodiment.

Each workflow item data structure 140 (and each of the data structures 150 and 154 described with respect to FIG. 14) is implemented according to the prescribed SML language 16, and therefore includes a strongly typed definitions for each of the elements within the workflow item data structure 140. As illustrated in FIGS. 12, 14, and 15, each workflow item data structure 140 can include a prescribed workflow identifier (of type "WorkID" and defined to have a semantic type, for example, of Integer or String) 144, a prescribed item identifier (of type "StateID" and defined to have a semantic type, for example, of Integer or String) 146, and one or more workflow item lambda functions 156, described below. Each of the workflow item data structures 140, and the data structures 150 and 154 of FIG. 14, can be stored in one or more physical and tangible data structures (e.g., stored within at least one non-transitory tangible storage medium 44) and compiled into the geospatial application 14 as described above with respect to FIG. 2.

As illustrated in FIG. 12, each of the workflow item data structures 140 specify the same value for the prescribed workflow identifier ("WorkID=1") 145, indicating membership within the workflow 142; in other words, the workflow 142 can be based on the workflow items 140 each having the same value for the prescribed workflow identifier 145. The prescribed item identifier 146 uniquely identifies the workflow item data structure 140 within the workflow 142. Hence, each workflow item data structure 140 provides a strongly typed definition for a corresponding workflow state (i.e., workflow item) 148 in the workflow 142 that can be rendered by a user interface circuit 106. Consequently, a data structure containing all the workflow item data structures 140 having the same prescribed workflow identifier 145 (e.g., a concatenated list, or "catalist") provides a strongly typed definition for the workflow 142 that can be rendered by the user interface circuit 106.

As illustrated in FIG. 12, the workflow item data structures 140 having the prescribed workflow identifier 145 can establish the workflow 142 in the form of a directed acyclic graph (DAG), where all the workflow states (i.e., workflow items) 148 of the workflow 142 can originate at a starting workflow state "1" (StateID=1) and can end at an ending workflow state "End", labeled in FIG. 12 as state "16" (StateID=n): the ending workflow state also can be a null terminated state without any corresponding workflow item data structure 140, such that any workflow state 148 that does not have any child state by default ends in the null terminated state. Hence, arbitrary workflows 142 can be established and generated by users, as described below, while maintaining non-Turing completeness in the geospatial application 14.

Figure 13:
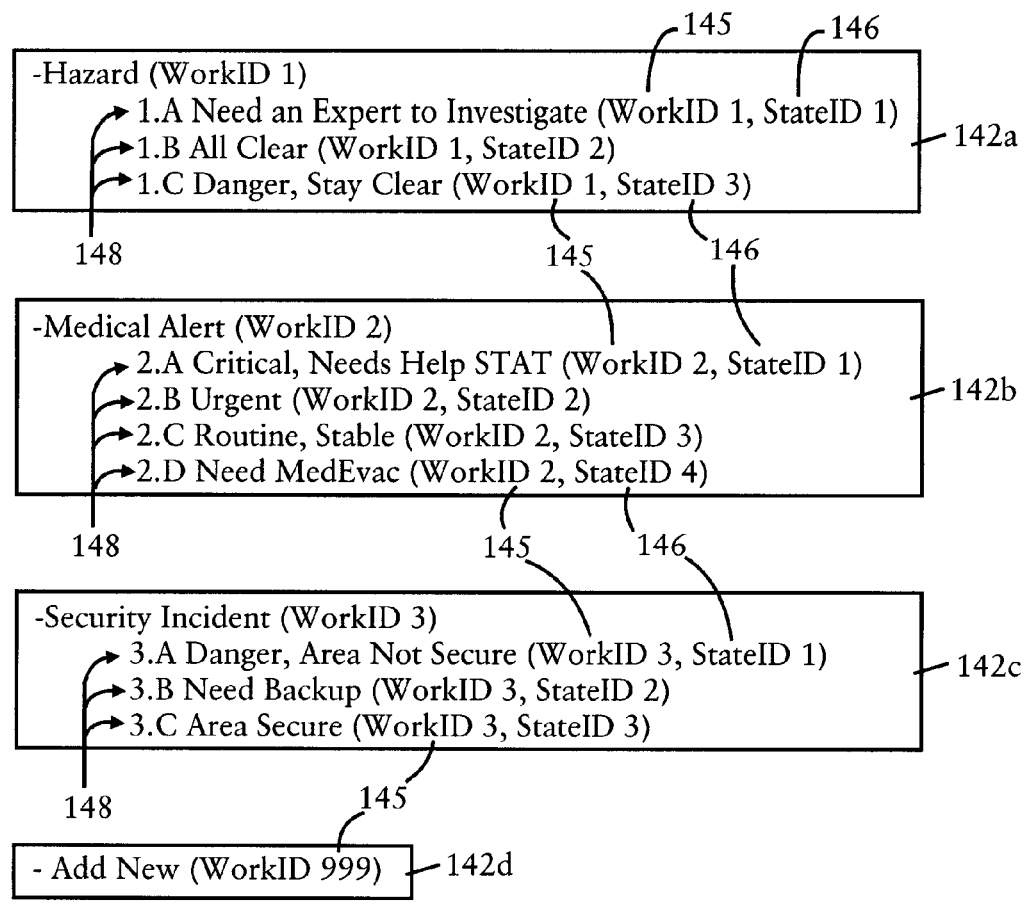
FIG. 13 illustrates example workflows for operating on entities in the geospatial application, according to an example embodiment.

FIG. 13 illustrates example workflows 142 for operating on geospatial entities 130 of FIG. 11, according to an example embodiment. Example workflows include a workflow 142a for investigating a hazard (e.g., investigating hazardous waste), a workflow 142b for identifying a medical alert (e.g., a person needing medical attention), a workflow 142c for identifying a security incident (e.g., a geospatial entity 130 poses a security threat or danger), and a default template 142 for adding new workflows. As described previously, each of the workflows 142 can be identified by the corresponding workflow identifier 145, and each workflow state 148 in a workflow 142 can be identified by its corresponding item identifier 146. The strongly typed definitions for the workflow item data structures 140 can permit a workflow state 148 to belong to one or more parents within the same workflow 142, and also can permit a workflow state 148 to belong to more than one workflow 142, if desired, in which case the workflow item data structure can specify additional workflow identifiers 145 and item identifiers 146 as a tuple identifying association with the second workflow 142.

A particular feature of the workflow item data structures 140 and associated workflows 142 is that a workflow can be considered a "first class" type entity (similar to a person-entity or a map-item entity), where a workflow 142 (and any workflow state 148) can exist in the geospatial application 14 without any association to any person or entity. In other words, a workflow 142 can have no associated "owner" at any workflow state 148, or a workflow 142 can one or more associated "owners" at a given workflow state 148; a workflow 142 also can have different associated owners as the workflow 142 moves from one workflow state 148 to another, described below.

A user can access any one of the workflows 142 by requesting, for example, execution of a workflow item lambda function (e.g., 156b of FIG. 14) that generates a query that causes the execution circuit 100 to return a concatenated list of workflow item data structures 140 having a matching workflow identifier 145; a concatenated list of all the workflows 142 also can be generated by the execution circuit 100.

FIG. 14 illustrates an example generation of a work entity data structure 150 that provides a strongly typed definition for a work entity 158 of FIG. 11, according to an example embodiment. The work entity data structure 150 is generated by the execution circuit 100 executing a strongly typed workflow item lambda function 156 (e.g., 156a or 156b) that associates a workflow item (defined by the workflow item data structure 140) 148 with one or more entities 130 of the ad hoc geospatial directory 108, the one or more entities 130 represented by the corresponding geospatial entity data structure 90. A workflow item lambda function 156 is a strongly typed lambda function that can generate a new strongly typed data structure representing a new or a modified workflow item data structure 140, a new or modified work entity data structure 150, and/or a new or modified work item entity data structure 154. Since no data structure is ever deleted from the geospatial applications 14, a modified data structure can be identified based on its monotonically increasing creation identifier (e.g., a timestamp or sequence identifier).

The interface circuit 102 and/or the API circuit 104 of FIG. 9 can receive, from a user interface such as a browser circuit 106a, a request for execution of the workflow item lambda functions (e.g., 156a or 156b). For example, the browser circuit 106a can be supplied the workflow item data structure 140 that includes a workflow item lambda function 156a for associating the corresponding defined workflow item 148 with an identified one of the entities 130 in the ad hoc geospatial directory 108: the workflow item lambda function 156a can be invoked by the user browser circuit 106a during rendering of the workflow item data structure 140 (e.g., while the user is browsing among available workflows 140), where the user can request associating one of the geospatial entities 130 with the workflow item 148 that is displayed based on the user interface 106 rendering the corresponding workflow item data structure 140. Hence, the workflow item lambda function 156a enables the workflow item data structure (identified by its workflow identifier 145 and its item identifier 146) 140 to be applied to the selected geospatial entity 130 as represented by its corresponding geospatial entity data structure 90. In response to the interface circuit 102 and/or the API circuit 104 receiving the request specifying execution of the workflow item lambda function 156a, the execution circuit 100 can execute the workflow item lambda function 156a to form (i.e., create), in the geospatial application 14, a new work entity data structure 150 defining a work entity 158 that associates the workflow item 148 with the selected geospatial entity 130. As described previously, the work entity data structure 150 also can include a monotonically increasing creation identifier such as a timestamp or sequence identifier.

Alternately, the browser circuit 106a can be supplied a geospatial entity data structure 90, where each geospatial entity data structure 90 that is supplied to a user browser 106a can include a workflow item lambda function 156b for requesting execution of one of the workflow items 148 on the corresponding entity 130 represented by the geospatial entity data structure 90: the workflow item lambda function 156b can be invoked by the user browser circuit 106a during rendering of the geospatial entity data structure 90, where the user can request associating one of the workflow items 148 (defined by its corresponding workflow item data structure 140) with the currently displayed geospatial entity 130. In response to the interface circuit (102 and/or 104) receiving the request, the execution circuit 100 in response can execute the workflow item lambda function 156b to create the work entity data structure 150.

As illustrated in FIG. 14, the work entity data structure 150 can associate the workflow item data structure 140 (uniquely identifiable in the geospatial application 14 by the tuple of the prescribed workflow identifier 145, and the prescribed item identifier 146) and the geospatial entity 130 (uniquely identifiable by its corresponding entity identifier 152) based on creating a tuple of the prescribed workflow identifier 145, a prescribed item identifier 146, and the entity identifier 152.

Hence, the work entity data structure 150 can provide a strongly typed definition of a work entity 158 within the geospatial application 14 and the ad hoc geospatial directory 108, where the work entity 158 defines execution of the overall workflow 142 on the geospatial entity 130. As described previously, all data structures in the geospatial application 14 include a monotonically increasing creation identifier (e.g., a time stamp or a sequence identifier), enabling a tracing of the workflow states 148 that are applied to the geospatial entity 130.

The work entity data structure 150 enables the execution circuit 100 to execute other workflow item lambda functions 156 for generation of a work item entity data structure 154 that can inherit elements from other workflow item data structures 140 and/or geospatial data structures 90, as desired. The execution circuit 100 can generate the work item entity data structure 154, and output the work item entity data structure 154 to the user interface circuit 106. The rendering of the work item entity data structure 154 by the user interface circuit 106 generates a "work item entity" or "work entity state" 160 that identifies the current workflow state 148 that is executed in the workflow 142 on the associated geospatial entity 130. Hence, the work item entity 160 includes the workflow item lambda functions 156 that enable the user to interact with the geospatial entity (e.g., 130b1 of FIG. 11) according to the current workflow state 148 of the work entity 158. Hence, the "work item entity" or "work entity state" 160 identifies the current workflow state 148 executed in the workflow 142 on the associated geospatial entity 130.

As illustrated in FIGS. 11 and 13, the current workflow state 148 of the work entity 158a (executing the workflow 142a of FIG. 13 on the geospatial entity 130b1) is the work item entity "Active Fire, Need Firefighter Here" 160, interpreted as "Active Fire, Need Firefighter Here for the Geospatial Entity 130b1". The work entity data structure 150 and the work item entity data structure 154 each can be stored in the ad hoc geospatial directory 108.

As illustrated with respect to FIGS. 11, 13, and 14, the generation by the execution circuit 100 of a work entity data structure 150 defines the work entity 158 that associates the geospatial entity 130b1 in FIG. 11 with the workflow 142a of FIG. 13; the work entity data structure 150 enables the execution circuit 100 to generate the work item entity data structure 154 that provides the strongly typed definition for the work item entity 160 representing the current execution state of the work entity 158. Hence, a user browser circuit 106a accessing the corresponding icon 130b1 can be presented automatically with the work item entity 160 (based on the interface circuit 106 rendering the corresponding work item entity data structure 154) that provides the current workflow state 148 of the workflow 142a assigned to the geospatial entity 130b. Hence, the work item entity 160 can provide a user with the current workflow state 148 (i.e., "execution state") of the corresponding workflow 142a as applied to the geospatial entity 130b, with workflow item lambda functions 156 providing options on how the user can update the status of the work item entity 160, as appropriate. As described in further detail below, the workflow item lambda functions 156 also can enable the user to modify the workflow state 148 within the workflow 142, based on modifying the work item entity data structure 154 that defines the corresponding work item entity 160.

FIG. 15 illustrates in further detail an example workflow item data structure 140, according to an example embodiment. The workflow item data structure 140 provides a strongly typed definition of a corresponding workflow item (i.e., workflow state) 148 of the workflow 140, and can include SML-based elements such as the prescribed workflow identifier 145, the prescribed item identifier 146, and at least one workflow item lambda function 156 for associating the corresponding workflow item data structure 140 (and the associated workflow item 148) with an identified one of the entities 130 in the ad hoc geospatial directory 108. Example strongly typed SML-based elements that can be defined within the workflow item data structure for the corresponding workflow item (i.e., workflow state) 148 include an availability label 162, a workflow state tag 164, a workflow state label 166, a parent state identifier 168, a child state identifier 170, and additional workflow item lambda functions 156 that enable a user to modify the workflow state 148.

The availability label 162 can specify whether the workflow item data structure 140 is available only to the user having requested generation of the workflow item data structure 140 (and identifiable by an owner identifier "Owner_ID"), or whether the workflow item data structure 140 is publicly available for other entities 130 in the ad hoc geospatial directory 108 (i.e., "Public"): as described below with respect to the workflow item lambda function 156c, a user invoking the workflow item lambda function 156c can specify as an input whether the resulting generated workflow item data structure 140 should be only privately available to the user, or whether the resulting generated workflow item data structure 140 can be publicly available as a "template" for other users. As described previously, the workflow item data structure 140 need not have an associated "owner" responsible for a given workflow state 148; hence, the availability label 162 can simply identify whether the workflow item data structure 140 is publicly available or not.

Figure 17:
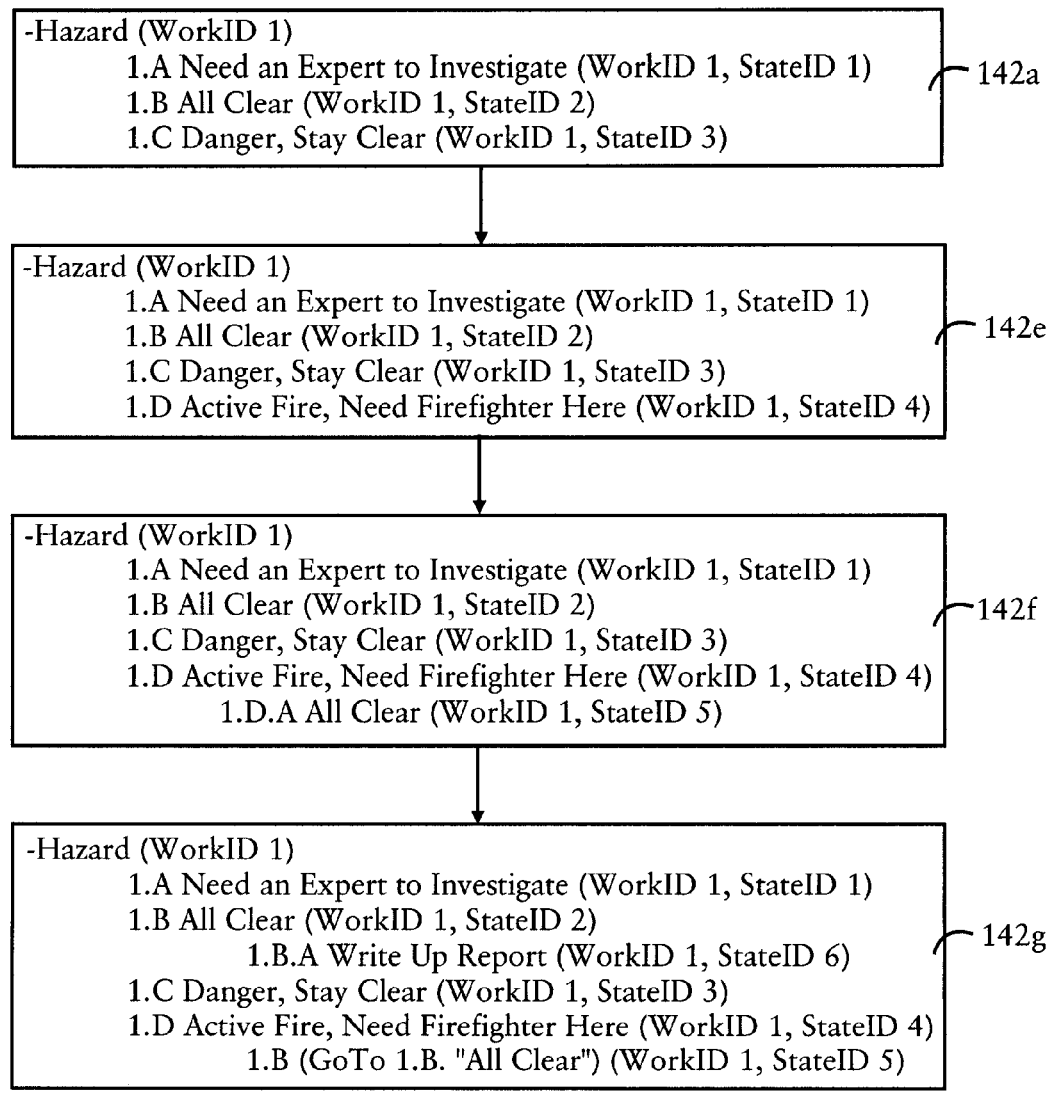
FIG. 17 illustrates an example sequence of the ad hoc modification of workflow states in a workflow by one or more users, according to an example embodiment.

The workflow state tag 164 can serve as an abbreviated label that illustrates in outline format the relative position of the corresponding workflow state 148 within the hierarchy of the overall workflow 142, illustrated for example in FIGS. 13 and 17: the workflow state tag 164 can either be added automatically during creation by the execution circuit 100, or added manually as an input as part of the lambda function 156c for creating a new child workflow state 148.

The workflow state label 166 can provide an alphanumeric string that is displayable by a user interface circuit 106 as the current workflow state 148 that is executed on a geospatial entity 130, i.e., the work entity state 160. In its simplest form, the workflow state label 166 can provide a visual representation of the work entity state 160 for a geospatial entity 130, illustrated in FIG. 11; as apparent from the foregoing, the resulting work item entity data structure 154 generated based on the workflow item data structure 140 also can include additional lambda functions that are relevant to the work entity state 160, for example initiating a voice over IP video or telephone call to a prescribed destination, using the workflow item lambda function 156a to associate the work item entity 160 with another geospatial entity 130, etc.

The parent state identifier 168 can identify another of the workflow item data structures 140 (and the corresponding workflow item 148) as a corresponding parent execution state in the workflow 142. For example, the parent state identifier 168 in the workflow item data structure 140 defining the workflow state "5" 148 in FIG. 12 will have two parent state identifiers 168 identifying the respective parent execution states "1" and "4".

The child state identifier 170 can identify one or more workflow item data structures 140 (and their respective workflow items 148) as child execution states in the workflow 142. Hence, the child states identifiers 170 can be displayed to a user during rendering by the interface circuit 106 of an associated work item entity data structure 154, enabling a user to choose the next child execution state 148 in the workflow 142 that should be executed for the associated geospatial entity 130.

The workflow item data structure 140 also includes workflow item lambda functions 156c, 156d, 156e, and 156f that enable a user to modify a workflow state 148. For example, the workflow item lambda function 156c enables a user to cause the execution circuit 100 to add a new child state 148. Available inputs to the workflow item lambda function 156c include: a private/public lambda function enabling the user to specify whether the modified workflow 142 should be selectively available for the other entities 130 in the ad hoc geospatial directory 108, as indicated by the resulting availability label 162 in the newly generated workflow item data structure 140, either as a private state viewable only by the user, or a public state that can be instantaneously implemented throughout the geospatial application 14 for use by other users; an Add Label lambda function enabling a user to add a workflow state label 166; an Add GoToBranch lambda function enabling a user to specify an automatic branching to another existing destination workflow state 148; or a lambda function for adding an existing Geospatial lambda function 92 to the child state.

The workflow item lambda function 156d enables a user to cause the execution circuit 100 to edit an existing child state 148, identifiable by its corresponding tuple of the workflow identifier 145 and item identifier 146. Example lambda functions available as inputs to the workflow item lambda function 156d can include: changing the existing workflow state label 166, adding or changing a GoToBranch lambda function to specify a new or alternate destination workflow state 148; adding or changing geospatial lambda function 92 in the child state; or deleting the existing child state 148.

The workflow item lambda function 156e enables a user to cause the execution circuit 100 to edit the current workflow item data structure 140 in order to modify the corresponding workflow item 148. Example changes include: a lambda function for adding a goto branch (equivalent to adding a new child state having a goto branch is executed in the lambda function 156c), modifying the existing workflow state label 166, changing attachment from the existing parent specified in the parent state 168 to a different parent state 148; or attaching to an additional parent state 148 (if desired, a lambda query also can be issued to identify available workflow items 148 that can be parent states).

The workflow item lambda function 156f enables a user to cause the execution circuit 100 to add a new workflow item 148, for example including a lambda function query for available workflow items, adding a new label for the new workflow item 148, adding a goto branch for the workflow item, or adding a geospatial lambda function 92 to the new workflow item 148. Hence, the workflow item lambda function 156f enables the execution circuit 100 to create a new workflow item data structure 140 for a corresponding new workflow item 148 that can be added anywhere within the workflow 142.

As described previously, the workflow item data structure 140 need not specify any user or identified individual, as the workflow state (and associated workflow 142) can exist in the geospatial application 14 without any association to any person, user or entity that "owns" the corresponding workflow state 148 (i.e., owns responsibility for completing the corresponding workflow state 148). If preferred, however, one or more tags can be added (e.g., by an associated lambda function) to the workflow item data structure 140 to associate one or more persons, users, or entities for ownership for completing the corresponding workflow state 148, for example in the case of a supervisor assigning responsibility, or a rescue worker claiming responsibility for completing the corresponding workflow state.

Figure 16:
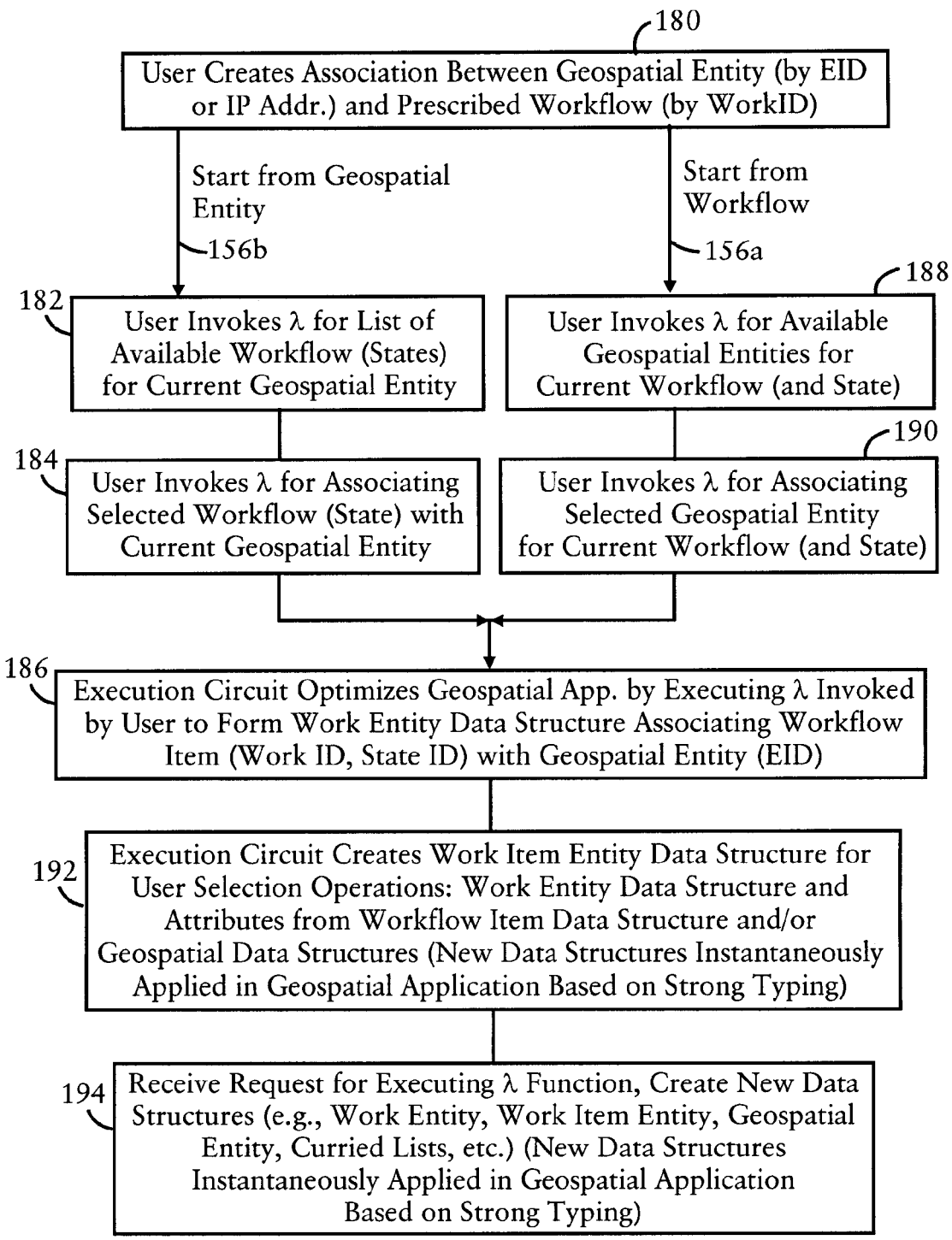
FIG. 16 illustrates an example method by the ad hoc devices of creating a work item entity for applying a workflow state to an entity of the ad hoc geospatial directory, and for ad hoc modification of the workflow state, according to an example embodiment.

FIG. 16 illustrates an example method by the execution circuit 100 of creating a work entity 158 and a work item entity 160 for applying a workflow state 148 to an identified entity 130 of the ad hoc geospatial directory 108, and for ad hoc modification of the workflow 142, according to an example embodiment.

A user interacting with an interface circuit 106 rendering either a workflow item data structure 140 (presenting an unassigned workflow state 148 that is not associated with a geospatial entity 130) or a geospatial entity data structure 90 (presenting a geospatial entity 130) can create an association between a geospatial entity and a prescribed workflow in step 180.

For example, the user can start from the geospatial entity 130 based on invoking the corresponding workflow item lambda function 156b within the geospatial entity data structure 90 rendered by the interface circuit 106: in this example, the user can invoke the workflow item lambda function 156b to cause the execution circuit 100 in step 182 to generate a curried list of available workflows 142, or available workflow states 148, that are available for the current geospatial entity 130 as defined by the geospatial entity data structure 90 rendered by the interface circuit 106. For example, filtering may be applied by the execution circuit 100 based on strong typing that defines those workflows 142 or workflow states 148 that are available for the current geospatial entity 130 displayed by the interface circuit 106. The user can then can invoke the supplied lambda function that causes the execution circuit 100 in response to execute in step 184 the invoked lambda function to associate the selected workflow 142 (and/ or selected workflow state 148) with the current geospatial entity 130, causing the execution circuit 100 in step 186 to create a work entity data structure 150 that associates the selected workflow item 148 (by workflow identifier 145 and item identifier 146) with the current geospatial entity 130, the work entity data structure 150 thereby defining the work entity 158 that associates the workflow item 148 with the geospatial entity 130.

Referring to step 180, the user also can start from a workflow state 148 displayed by the interface circuit 106 executing the corresponding workflow item data structure 140. In this example, the user can invoke the corresponding workflow item lambda function 156a within the workflow item data structure 140: in this example, the user can invoke the workflow item lambda function 156a to cause the execution circuit 100 in step 188 to generate a curried list of available geospatial entities 130 for the current workflow 142 and/or workflow state 148. As described previously, strong typing can define those geospatial entities 130 that are available for the current workflow state 148 displayed by the interface circuit 106. The user can then invoke the supplied lambda function that causes the execution circuit 100 in response to execute in step 190 the invoked lambda function to associate in step 186 the selected geospatial entity with the currently displayed workflow 142 and/or workflow state 148.

Hence, the execution circuit 100 can execute a lambda function as requested by the user interface circuit 106 to form in step 186 the work entity data structure 150 that provides a strongly typed definition of the work entity 158 that associates the workflow item 148 with the geospatial entity 130, enabling the work entity 158 to define the execution of the workflow 142 on the corresponding geospatial entity 130. The execution circuit 100 also can execute the strong typing in the geospatial application 14 to create in step 192 a work item entity data structure 154 providing a strongly typed definition of a work item entity 160. The work item entity data structure 154 can include any of the attributes from the associated workflow item data structure 140 and/or the geospatial entity data structure 90, including any lambda functions 92 specified in the geospatial entity data structure 90 and/or any lambda functions 156 specified in the workflow item data structure 140. Hence, the work item entity data structure 154 can inherit any or all of the attributes of the respective data structures defining the workflow state 148 and the geospatial entity 130. Further, strong typing guarantees that any new data structures are instantaneously applied in the geospatial application 14, such that the newly created work item entity data structure 154 can be automatically applied to other data structures in the ad hoc geospatial directory 108 and/or the geospatial application 14, as needed.

The work item entity data structure 154 can be output, by the execution circuit 100, via an interface circuit (e.g., 102 or 104) to the user interface circuit 106, enabling the user interface circuit 106 to render the work item entity data structure 154 for display of the work item entity 160 containing at least one workflow item lambda function 156 enabling the user to modify the workflow state 148 of the geospatial entity 130. The user can then interact with the work item entity 160 displayed by the interface circuit 106, for example invoking any of the lambda functions 156 illustrated in FIG. 15 that are inherited by the work item entity data structure 154. As described previously with respect to FIG. 15, the work item entity data structure 154 can specify an "owner" (inherited from the associated workflow item data structure), or a workflow item lambda function for associating the work item entity data structure 154 with an entity (e.g., assigning ownership responsibility for executing the corresponding work entity state 160 to an identifiable geospatial entity), either "privately" (for only the specific work entity state 160) or "publicly" (for the workflow state 148 in the workflow 142, regardless of association to a geospatial entity).

Assuming in step 194 that the user chooses one of the workflow item lambda functions 156 from the work item entity data structure 154 rendered by the interface circuit 106, the chosen workflow item lambda function 156 (and the appropriate input parameters) are received by the interface circuit (e.g., 102 or 104) of the computing device 70 from the interface circuit 106, enabling the execution circuit 100 to execute in step 194 the lambda function for creation of the new data structure, for example a new work entity data structure 150, a new work item entity data structure 154, a new geospatial entity 130, curried lists, etc., that can result in modification of the work entity state 160. For example, a user can simply choose to advance the work entity state to another state in the associated workflow 142, causing creation of a new data structure reflecting an update of the work entity data structure 150 and work item entity data structure 154 (by virtue of a more recent creation identifier).

Alternately, a user can request modification of the work entity 158 that results in creation of a new work entity state 160 with respect to the associated geospatial entity 130. As described previously, the strong typing enables the change to be selectively available for the other entities 130 in the ad hoc geospatial directory 108 (if the change in the lambda function 156c is designated as public), resulting in instantaneous updating of the associated workflow states 148 and the workflow 142 throughout the geospatial application 14.

FIG. 17 illustrates an example sequence of an ad hoc modification of a workflow 142 by a user implementing a change within a work entity state 160, according to an example embodiment. The ad hoc modification illustrated in FIG. 17 can be executed by the execution circuit 100 responding to a user request for execution of one of the workflow item lambda functions 156 invoked during rendering by the interface circuit 106 of the workflow item data structure 140, or rendering by the interface circuit 106 of a work item entity data structure 154 containing a workflow item lambda function 156. Assume in this example that the user invokes the workflow item lambda function 156f while interacting with a work item entity 160 for the geospatial entity 130b1, based on the user interface circuit 106 rendering a work item entity data structure 154 having inherited the workflow item lambda function 156f from the corresponding workflow item data structure 140. The user can decide that there is an active fire at the geospatial entity 130b1, and that a firefighter is needed at the location of the geospatial entity 130B1: hence, the user can invoke the workflow item lambda function 156f to add the workflow state "1.D Active Fire, Need Firefighter Here" 148 to the workflow 142a that is currently applied to the geospatial entity 130b1.

In response to the interface circuit 102 or 104 receiving, from the user interface circuit 106, a request for execution of the workflow item lambda function 156f to add the workflow state "1.D Active Fire, Need Firefighter Here" 148 to the workflow 142a, the execution circuit 100 can execute the workflow item lambda function 156f to generate the workflow item data structure 140 illustrated in FIG. 15 for the newly added workflow state "1.D Active Fire, Need Firefighter Here" 148 to the workflow 142e.

As described previously, even though the request by the user was only concerned with adding the newly added workflow state "1.D Active Fire, Need Firefighter Here" 148 for use on the geospatial entity 130b1, strong typing in the SML-based geospatial application 14 enables the added workflow item 148 defined by the newly added workflow item data structure 140 to be selectively added instantaneously throughout the geospatial application 14, by the execution circuit 100, based on the user choosing a public template option, even though the request by the user was with respect to the specific work item entity 160 associated with the geospatial entity 130b1. The interface circuit 102 or 104 can output the updated work item entity data structure 154 reflecting the newly added workflow item 148 to the user interface circuit 106 for display.

In response to the user interface 106 rendering the work item entity data structure 154 that displays the work item entity "1.D Active Fire, Need Firefighter Here for Entity 130b1" 160 of the workflow 142e applied to the geospatial entity 130b1, the user can invoke the workflow item lambda function 156c from the work item entity data structure 154 to add a new child state "1.D.A. All Clear". In response to the execution circuit 100 receiving the request from the user interface 106 for execution of the workflow item lambda function 156c, the execution circuit 100 can create the corresponding workflow item data structure 140 as a child to the workflow state "1.D Active Fire, Need Firefighter Here" 148, which can be inherited simultaneously by all other data structures in the geospatial application 14 based on strong typing. Hence, the execution circuit 100 can output to the user interface 106 the work item entity data structure 154 for the geospatial entity 130b1, enabling the user to apply the workflow 142f to the geospatial entity 130b1. As described previously, the foregoing changes to workflows 142a and 142e also can be available instantaneously to all other geospatial users, assuming the user identify the changes is publicly available.

The user interacting with the work item entity 160 may decide from viewing the workflow 142f as applied to the geospatial entity 130b1 to invoke the workflow item lambda function 156c to add the child state "1.B.A Write Up Report", and invokes the workflow item lambda function 156e to change the redundant child state "1.D.A" in the workflow 142f to a "GoTo" branch that branches to the workflow state "LB All Clear". Hence, the execution circuit 100, in response to receiving the lambda functions 156c and 156e from the work item entity 160 executed by the user interface 106, can create the respective workflow item data structures 140 for the new child state "1.B.A" (Work ID 1, State ID 6), and the revised child state of the workflow state "1.D" having the workflow identifier "Work ID 1" 156 and the item identifier "StateID 5" 146, resulting in the workflow 142g that is instantaneously available to all other users and all other work item entity data structures 154 in the geospatial application 14 and/or the ad hoc geospatial directory 108.

According to the example embodiments, static, strong typing can be applied in an SML-based geospatial application to provide ad hoc generation of work item entities that associate a workflow state of a prescribed workflow 142 with a geospatial entity 130, enabling users to update the work entity state for a geospatial entity on an ad hoc basis. Moreover, the strong typing implemented in the geospatial application enables any change by a given user to be instantaneously applied to all other workflow based data structures in the ad hoc distributed geospatial system.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   receiving from a user interface, by a computing device, a request for execution of at least one lambda function in an operation of a geospatial application, the geospatial application having lambda functions for operating on at least one of a workflow item or one or more entities of an ad hoc geospatial directory, the workflow item including at least one of the lambda functions for a workflow in the geospatial application; and
   executing by the computing device the at least one lambda function to form, in the geospatial application, a work entity that associates the workflow item with one of the entities, the work entity defining execution of the workflow on the one entity;
   wherein the workflow item includes a prescribed workflow identifier and a prescribed item identifier identifying the workflow item within the workflow, the workflow based on a plurality of the workflow items each having the prescribed workflow identifier;
   wherein the workflow items having the prescribed workflow identifier establish the workflow as a directed acyclic graph, the workflow items each including at least one of a parent state identifier identifying another one of the workflow items as a corresponding parent execution state in the workflow, or a child state identifier identifying another one of the workflow items as a corresponding child execution state in the workflow.

2. The method of claim 1, further comprising the computing device generating and outputting, to the user interface, a work item entity associated with the work entity for the one entity and containing at least one workflow item lambda function enabling a user to modify a workflow state of the one entity.

3. The method of claim 2, further comprising the computing device modifying the workflow based on creating a new workflow item in response to executing the workflow item lambda function received from the user interface with respect to the one entity, the modified workflow selectively available for the other entities in the ad hoc geospatial directory.

4. The method of claim 1, wherein each of the workflow items include at least one workflow item lambda function for executing at least one of modifying the corresponding workflow item, modifying a corresponding child state, adding a new child state to the workflow from the corresponding workflow item, or associating the corresponding workflow item with an identified one of the entities in the ad hoc geospatial directory.

5. The method of claim 4, wherein the executing includes generating a work item entity data structure associated with the work entity and containing the workflow item lambda function for the corresponding workflow item, the method further comprising supplying the work item entity data structure to the user interface, enabling a user to modify a workflow state of the corresponding entity.

6. The method of claim 1, wherein each entity in the ad hoc geospatial directory has a prescribed entity identifier and each workflow item has a prescribed item identifier, the entities in the ad hoc geospatial directory each including a lambda function for requesting execution of one of the workflow items on the corresponding entity, the request specifying execution of the one of the lambda functions on an identified one of the workflow items for the corresponding entity.

7. The method of claim 1, wherein each entity in the ad hoc geospatial directory has a prescribed entity identifier and each workflow item has a prescribed item identifier, each of a plurality of workflow items in the geospatial application including a lambda function for associating one of the entities with the corresponding workflow item on the corresponding entity, the request specifying execution of the one of the lambda functions on the corresponding workflow item for the one entity.

8. An apparatus comprising:
   an interface circuit configured for receiving from a user interface a request for execution of at least one lambda function in an operation of a geospatial application, the geospatial application having lambda functions for operating on at least one of a workflow item or one or more entities of an ad hoc geospatial directory, the workflow item including at least one of the lambda functions for a workflow in the geospatial application; and an execution circuit configured for executing the at least one lambda function to form, in the geospatial application, a work entity that associates the workflow item with one of the entities, the work entity defining execution of the workflow on the one entity;

wherein the workflow item includes a prescribed workflow identifier and a prescribed item identifier identifying the workflow item within the workflow, the workflow based on a plurality of the workflow items each having the prescribed workflow identifier;

wherein the workflow items having the prescribed workflow identifier establish the workflow as a directed acyclic graph, the workflow items each including at least one of a parent state identifier identifying another one of the workflow items as a corresponding parent execution state in the workflow, or a child state identifier identifying another one of the workflow items as a corresponding child execution state in the workflow.

9. The apparatus of claim 8, wherein the execution circuit is configured for generating, for output to the user interface, a work item entity associated with the work entity for the one entity and containing at least one workflow item lambda function enabling a user to modify a workflow state of the one entity.

10. The apparatus of claim 9, wherein the execution circuit is configured for modifying the workflow based on creating a new workflow item in response to executing the workflow item lambda function received from the user interface with respect to the one entity, the modified workflow selectively available for the other entities in the ad hoc geospatial directory.

11. The apparatus of claim 8, wherein each of the workflow items include at least one workflow item lambda function for executing at least one of modifying the corresponding workflow item, modifying a corresponding child state, adding a new child state to the workflow from the corresponding workflow item, or associating the corresponding workflow item with an identified one of the entities in the ad hoc geospatial directory.

12. The apparatus of claim 11, wherein the execution circuit is configured for generating a work item entity data structure associated with the work entity and containing the workflow item lambda function for the corresponding workflow item, the interface circuit configured for supplying the work item entity data structure to the user interface, enabling a user to modify a workflow state of the corresponding entity.

13. The apparatus of claim 8, wherein each entity in the ad hoc geospatial directory has a prescribed entity identifier and each workflow item has a prescribed item identifier, the entities in the ad hoc geospatial directory each including a lambda function for requesting execution of one of the workflow items on the corresponding entity, the request specifying execution of the one of the lambda functions on an identified one of the workflow items for the corresponding entity.

14. The apparatus of claim 8, wherein each entity in the ad hoc geospatial directory has a prescribed entity identifier and each workflow item has a prescribed item identifier, each of a plurality of workflow items in the geospatial application including a lambda function for associating one of the entities with the corresponding workflow item on the corresponding entity, the request specifying execution of the one of the lambda functions on the corresponding workflow item for the one entity.

15. The apparatus of claim 8, wherein the workflow item, the entities, and the work entity each are implemented by the execution as a corresponding at least one data structure having a strongly typed definition, for storage in a non-transitory computer readable storage medium.

16. Non-transitory logic encoded in one or more non-transitory tangible media for execution by a computing device and when executed operable for:

receiving from a user interface, by the computing device, a request for execution of at least one lambda function in an operation of a geospatial application, the geospatial application having lambda functions for operating on at least one of a workflow item or one or more entities of an ad hoc geospatial directory, the workflow item including at least one of the lambda functions for a workflow in the geospatial application; and executing by the computing device the at least one lambda function to form, in the geospatial application, a work entity that associates the workflow item with one of the entities, the work entity defining execution of the workflow on the one entity;

wherein the workflow item includes a prescribed workflow identifier and a prescribed item identifier identifying the workflow item within the workflow, the workflow based on a plurality of the workflow items each having the prescribed workflow identifier;

wherein the workflow items having the prescribed workflow identifier establish the workflow as a directed acyclic graph, the workflow items each including at least one of a parent state identifier identifying another one of the workflow items as a corresponding parent execution state in the workflow, or a child state identifier identifying another one of the workflow items as a corresponding child execution state in the workflow.

17. The logic of claim 16, wherein each entity in the ad hoc geo spatial directory has a prescribed entity identifier and each workflow item has a prescribed item identifier, the entities in the ad hoc geospatial directory each including a lambda function for requesting execution of one of the workflow items on the corresponding entity, the request specifying execution of the one of the lambda functions on an identified one of the workflow items for the corresponding entity.

18. The logic of claim 16, wherein the geospatial application describes functions according to a prescribed symbol manipulation language, the prescribed symbol manipulation language a non-Turing complete language that does not permit partial functions and describes the functions independent of any attribute of any computing system.

19. The method of claim 1, wherein the geospatial application describes functions according to a prescribed symbol manipulation language, the prescribed symbol manipulation language a non-Turing complete language that does not permit partial functions and describes the functions independent of any attribute of any computing system.

20. The apparatus of claim 8, wherein the geospatial application describes functions according to a prescribed symbol manipulation language, the prescribed symbol manipulation language a non-Turing complete language that does not permit partial functions and describes the functions independent of any attribute of any computing system.

* * * * *